United States Patent [19]

Willand et al.

[11] Patent Number: 5,501,821
[45] Date of Patent: Mar. 26, 1996

[54] OPTICAL ARTICLE EXHIBITING A LARGE FIRST HYPERPOLARIZABILITY

[75] Inventors: Craig S. Willand, Pittsford; Douglas R. Robello, Webster; Edward J. Urankar, Ithaca; Abraham Ulman, Rochester, all of N.Y.

[73] Assignee: Eastman Kodak Company, Rochester, N.Y.

[21] Appl. No.: 19,815

[22] Filed: Feb. 19, 1993

Related U.S. Application Data

[63] Continuation-in-part of Ser. No. 976,832, Nov. 16, 1992, abandoned.

[51] Int. Cl.[6] .................................................. F21V 9/00
[52] U.S. Cl. ........................... 252/582; 252/587; 252/589
[58] Field of Search ................................ 252/582, 600, 252/587, 589; 359/326, 328

[56] References Cited

U.S. PATENT DOCUMENTS

| | | | |
|---|---|---|---|
| 3,364,186 | 1/1968 | Wilhelm et al. | 260/1 |
| 3,923,762 | 12/1975 | Stolka et al. | 260/89.5 |
| 4,029,561 | 6/1977 | McGinniss | 204/181 |
| 4,037,018 | 7/1977 | McGinniss | 428/418 |
| 4,242,499 | 12/1980 | Allcock et al. | 528/399 |
| 4,339,237 | 7/1982 | Wang et al. | 8/405 |

(List continued on next page.)

FOREIGN PATENT DOCUMENTS

| | | |
|---|---|---|
| 284229-A | 9/1988 | European Pat. Off. . |
| 326133-A | 8/1989 | European Pat. Off. . |
| 356041-A | 2/1990 | European Pat. Off. . |
| 3322945-A | 1/1985 | Germany . |
| 63-017090-A | 1/1988 | Japan . |
| 01233247-A | 9/1989 | Japan . |
| 10231031-A | 9/1989 | Japan . |
| 2209169 | 5/1989 | United Kingdom . |

OTHER PUBLICATIONS

Katz, H. E. et al, Journal of the American Chemical Society, (1989), vol. 111, pp. 7554–7557.
Katz, H. E. et al, Chapter 17, ACS Symposium Series 455, (1990).
Levine, B. F. et al, Journal of Chemical Physics, vol. 65, No. 5 (Sep. 1976), pp. 1989–1993.
Kelderman, E. et al, Angew Chem. Int. Ed. Engl., vol. 31, No. 8, (1992), pp. 1075–1077.
Meredith, G. R. et al, Macromolecules, vol. 15, (1982), pp. 1385–1389.
Cheng, L. T. et al, Journal of Physical Chemistry, vol. 95, (1991), ppl 10631–10643 and pp. 10643–10652.
Singer, L. T. et al, Applied Physics Letters, vol. 49, (1986), pp. 248–250.
Ulman A. et al, Journal of the American Chemical Society, (1990), vol. 112, pp. 7083–7090.
Lange's Handbook Of Chemistry, 13th Edition, ed. John A. Dean, McGraw-Hill Co., New York, pp. 3–135 to 3–140, (1980).
Hart, H. et al, Tetrahedron, vol. 43, No. 22, pp. 5203–5224, 1987.

Primary Examiner—Philip Tucker
Attorney, Agent, or Firm—Robert Luke Walker

[57] ABSTRACT

An optical article, for the transmission of electromagnetic radiation. The optical article includes a medium, which exhibits a second-order electric susceptibility greater than $10^{-9}$ electrostatic units. The medium includes polar aligned dipole subunits. Each dipole subunit has a plurality of noncentrosymmetric molecular dipoles and a connector system. Each molecular dipole has an electron donor moiety, an electron acceptor moiety, and a linking moiety. The linking moiety has a pair of covalent bonds to the connector system. Each molecular dipole has a conjugated $\pi$ bonding system extending from the electron donor moiety along the linking moiety to the electron acceptor moiety to permit oscillation of the molecular dipole between a ground state and an excited state, which states differ in polarity. The connector system joins the linking moieties to complete a solitary ring or a system of fused rings, which retain the molecular dipoles in substantially parallel relative relation.

26 Claims, 6 Drawing Sheets

U.S. PATENT DOCUMENTS

| | | | |
|---|---|---|---|
| 4,362,832 | 12/1982 | Locatelli | 524/102 |
| 4,383,903 | 5/1983 | Ayano et al. | 204/159.16 |
| 4,581,317 | 4/1986 | Simmons, III | 430/270 |
| 4,619,990 | 10/1986 | Elmasry | 534/573 |
| 4,666,819 | 5/1987 | Elmasry | 340/270 |
| 4,731,436 | 3/1988 | Ling | 528/322 |
| 4,784,805 | 11/1988 | Blattner | 260/352 |
| 4,792,208 | 12/1988 | Ulman et al. | 350/96.34 |
| 4,796,971 | 1/1989 | Robello et al. | 350/96.34 |
| 4,886,339 | 12/1989 | Scozzafava et al. | 350/96.34 |
| 4,935,292 | 6/1990 | Marks et al. | 428/220 |
| 4,938,896 | 7/1990 | Choe et al. | 252/587 |
| 4,943,617 | 7/1990 | Etzbach et al. | 525/329.9 |
| 4,946,235 | 8/1990 | Scozzafava et al. | 350/96.34 |
| 4,948,843 | 8/1990 | Roberts et al. | 525/328.2 |
| 4,954,288 | 9/1990 | East | 252/299.81 |
| 4,955,977 | 9/1990 | Dao et al. | 350/96.34 |
| 4,997,897 | 3/1991 | Melpolder | 526/284 |
| 5,008,043 | 4/1991 | Robello et al. | 252/582 |
| 5,176,854 | 1/1993 | Ito et al. | 252/582 |
| 5,354,511 | 10/1994 | Wu et al. | 252/582 |

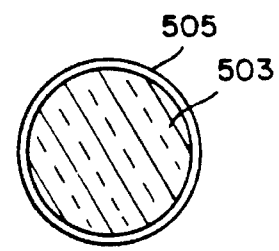
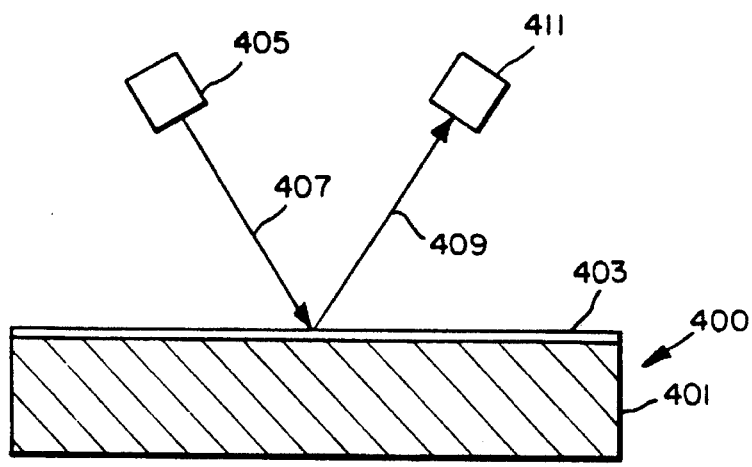
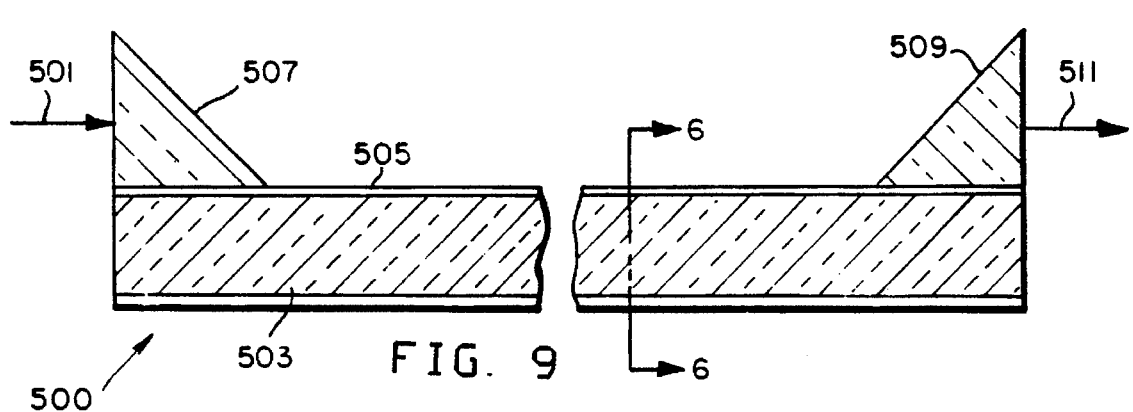
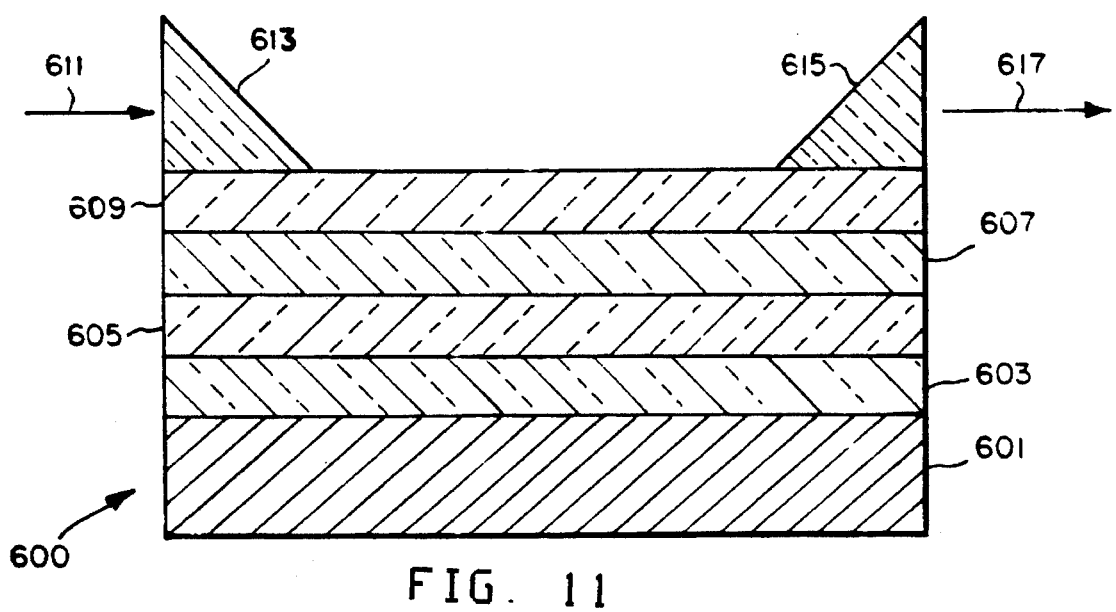

OPTICAL ARTICLE EXHIBITING A LARGE FIRST HYPERPOLARIZABILITY

This is a continuation-in-part of application Ser. No. 976,832, filed Nov. 16, 1992, now abandoned.

FIELD OF THE INVENTION

The invention relates to optical articles, particularly articles which exhibit effects attributable to the polarization of electromagnetic radiation. The invention relates specifically to optical articles which exhibit effects attributable to the nonlinear polarization of electromagnetic radiation.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed by the equation:

$$P=\alpha E+\beta E^2+\gamma E^3 \cdots$$

where P is the total induced polarization, E is the local electric field created by electromagnetic radiation, and $\alpha$, $\beta$, and $\gamma$ are the first, second, and third order polarizabilities, each of which is a function of molecular properties. $\beta$ and $\gamma$ are also referred to as first and second hyperpolarizabilities, respectively. On a macromolecular level corresponding relationships can be expressed by the equation:

$$P=\chi^{(1)}E+\chi^{(2)}E^2+\chi^{(3)}E^3 \cdots$$

where P is the total induced polarization, E is the local electric field created by electromagnetic radiation, and $\chi^{(1)}$, $\chi^{(2)}$, and $\chi^{(3)}$ are the first, second, and third order electric susceptibilities of the electromagnetic wave transmission medium. $\chi^{(2)}$ and $\chi^{(3)}$ are also referred to as the first and second nonlinear electric susceptibilities, respectively, of the transmission medium.

Second order nonlinear optical (NLO) effects are useful for a variety of optical devices, including electrooptic modulation and frequency conversion. The bulk second order susceptibility, $\chi^{(2)}$, represents a "figure of merit" for the performance of a material in an NLO device. To achieve on a macromolecular level second order polarization ($\chi^{(2)}E^2$) of any significant magnitude, it is essential that the transmission medium exhibit second order (first nonlinear) electric susceptibilities, $\chi^{(2)}$, greater than $10^{-9}$ electrostatic units (esu). This typically corresponds to a value of the first hyperpolarizability, $\beta$, of greater than about $10^{-30}$ esu.

In attempts to gain increased $\chi^{(2)}$, researchers have turned to organic materials over traditional inorganic materials such as lithium niobate. A large number of organic chromophores have been synthesized that possess substantial second-order NLO properties. A significant difficulty encountered in finding suitable materials for second order polarization effects lies in the molecular requirements that must be satisfied to achieve usefully large values of $\beta$. For a molecule to exhibit values of $\beta$ greater than zero, it is necessary that the molecule be asymmetrical about its center—that is, noncentrosymmetric. It has been observed experimentally and explained by theory that large $\beta$ values can result from large differences between ground and excited state dipole moments as well as large oscillator strengths, characteristics commonly displayed by charge-transfer molecules. A typical chemical structure that provides these effects has the combination of an electron donor moiety and an electron acceptor moiety linked by a conjugated $\pi$-molecular orbital framework. The terms "electron donor moiety" and "electron acceptor moiety" are used herein, as those terms are typically used in the art, to refer to groups or atoms having negative and positive values, respectively, of the Hammett $\sigma$para substituent constant (also referred to herein as "Hammett-sigma"). Unless otherwise indicated, Hammett-sigmas stated herein are from Lange's Handbook of Chemistry, 13th edition, ed. John A. Dean, McGraw-Hill Co., New York, page 3–135 to page 3–140. The term "molecular dipole" is commonly used to designate a molecule or moiety that can be represented by the general structure

```
D
|
L
|
A
``` where D is an electron donor moiety, L is a linking moiety and A is an electron acceptor moiety. The linking moiety has a conjugated $\pi$ bonding system, which provides a pathway for charge transfer resonance between the electron donor moiety and the electron acceptor moiety. A molecular dipole can be a discrete molecule or a moiety which is a part of a larger molecule, such as a group pendent from a macromolecular backbone.

For a bulk material to exhibit nonzero $\chi^{(2)}$, the molecular dipoles must be arranged in a noncentrosymmetric fashion. One of the most common techniques for establishing this arrangement is electric field poling. For an initially amorphous or glassy system that is made noncentrosymmetric by electric field poling, the following expression holds:

$$\chi^{(2)} \propto N\beta^* L(E\mu/kT).$$

$\beta$ is the molecular first hyperpolarizability. N is the concentration of molecules which exhibit NLO activity, that is, the concentration of molecules, which each include at least one molecular dipole. L is a third order Langevin function that takes values between 0 and 1. E is the electric field applied during poling. $\mu$ is the ground state dipole moment. T is the absolute temperature. k is Boltzmann's constant. For typical poling voltages and dipole moments, the Langevin function is linear with respect to its arguments and the equation can be simplified to:

$$\chi^{(2)} \propto NE\mu\beta/kT.$$

Many of the quantities in this expression are subject to practical limitations. The concentration of NLO-active species cannot be made much greater than approximately $10^{22}$ molecules/cm$^3$. The poling voltage cannot be higher than about 300 V/$\mu$m without the probability of cataclysmic dielectric breakdown in the sample. Alignment is not retained after poling a material unless the temperature during poling is at or above the glass transition temperature (Tg) of the material, which in turn must be well above ambient temperature to prevent subsequent relaxation of the induced order upon cooling to ambient temperature and removal of the poling field. Therefore $\mu$ and $\beta$ represent the principal quantities subject to modification in efforts to develop improved NLO materials. On this basis the product $\mu\beta$ represents a figure of merit for an NLO material that is to be oriented by poling.

While there is no theoretical limit to the magnitude of $\beta$ for organic molecules, in practice it has been found that an increase in the nonlinearity, β, is accompanied by a red-shift in the absorbance band. Since the propagated light in NLO devices is usually visible or near-infrared, it is desirable that the NLO material be completely transparent at those wavelengths. Even a small absorbance causes undesirable attenuation and in some cases deleterious photochemical reactions or localized heating of the material. These effects are major shortcomings which can substantially decrease practical NLO performance.

A similar shortcoming has been found for increases in $\mu$, the dipole moment of the molecule to be poled. More polar NLO chromophores generally possess red-shifted absorption spectra.

Since the principal axes of $\mu$ and $\beta$ are nearly collinear for typical molecular dipoles, it has been proposed that molecular dipoles could be tethered together so as to cause their dipole moments to add constructively. The group of atoms representing the molecular dipoles and the atoms tethering the molecular dipoles together are referred to herein as a "dipole subunit". A dipole subunit is a discrete molecule or a moiety which is a part of a larger molecule, for example, a moiety pendent from a macromolecular backbone.

Previous efforts have succeeded in arranging molecular dipoles in a head-to-tail assembly, and modifying the net dipole moment, however, a major enhancement of $\mu\beta$ has not been achieved. For example, Katz, H. E., et al, "Head-to-Tail Assemblies of Dipolar, Piperazine-Linked Chromophores: Synthesis, X-ray Structure, and Dielectric Characterization", Journal of the American Chemical Society, (1989), Vol. 111, 7554–7557 teaches head-to-tail dimers and oligomers which have a 6 to 28 percent enhancement in dipole moment in comparison to the monomers.

Katz, H. E., et al, "Chapter 17, Molecular Design for Enhanced Electric Field Orientation of Second-Order Nonlinear Optical Chromophores", Materials for Nonlinear Optics Chemical Perspectives, edit. Marder, S. E. et al, ACS Symposium Series 455, (1991), pp 267–278; discloses an attempt to arrange molecular dipoles in which two chromophores project in parallel directions from a rigid molecular backbone. This reference indicates that the following reaction was performed:

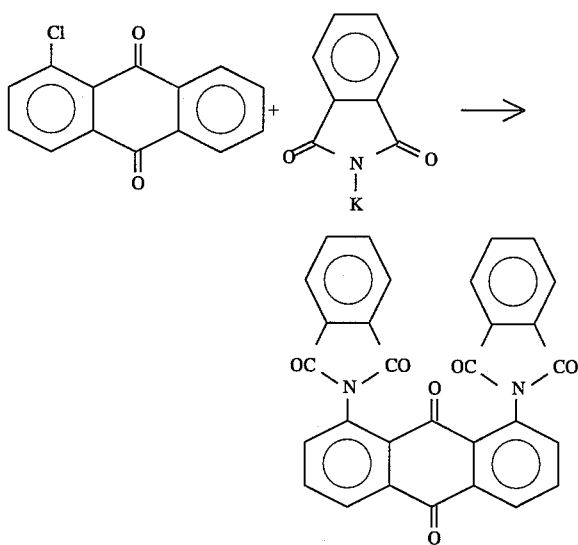

and states in relation to that reaction: "A more rigidly parallel pair of bonds for the projection of chromophores are the 1,8 positions of anthracene and anthraquinone. The respective 1,8-dichlorides undergo a limited substitution chemistry, which we extend as shown in {the above equation} to synthesis parallel-directed but weakly dipolar phthalimides. In principle, the use of donor-substituted phthalimide nucleophiles in the reaction of {the above equation} would give a fully additive pair of strong dipoles; however, this has not yet been accomplished." (p 269) The sole reaction product disclosed has the shortcoming that the "weakly dipolar phthalimides" which are linked through one end to the conjugated ring system, would appear by reference to standard tables of Hammett-Sigma values in Lange's Handbook of Chemistry to not even meet the definition of molecular dipoles. Another shortcoming is presented by the linking of the two "dipolar" groups through a conjugated ring system. Dipoles linked by a conjugated system have an electronic absorption spectrum that is red-shifted in comparison to the absorption spectrum of a uncorrelated mixture of the component molecular dipoles.

Levine, B. F., et al, "Second order hyperpolarizability of a polypeptide α-helix: Poly-γ-benzyl-L-glutamate", The Journal of Chemical Physics, Vol. 65, No. 5, (1 Sep. 1976), pp 1989–1993; teaches a dipole subunit in which molecular dipoles are covalently bonded linearly, but are held in substantially parallel relation by the non-covalent bonding of an alpha-helix. This material has the shortcoming of being highly labile in that the alpha-helix configuration is only present in a narrow range of conditions of solvent, temperature and the like.

Kelderman, E., et al, Angew. Chem. Int. Ed. Engl., Vol. 31, No. 8, (1992) pp 1075–1077; teaches a calix[4]arene having four phenol moieties connected by single methylene bridges. The phenol moieties are functionalized to provide four molecular dipoles. Meredith, G. R. et al, Macromolecules, Vol. 15, (1982), pp 1385–1389; teaches a liquid crystal polymer in which molecular dipoles are correlated by the non-covalent interactions of the liquid crystal.

It is therefore desirable to provide an optical article in which molecular dipoles are not correlated by only non-covalent interactions or only single covalent bonds, which are subject to rotation with heating.

SUMMARY OF THE INVENTION

The invention, in its broader aspects, provides an optical article, for the transmission of electromagnetic radiation. The optical article includes a medium, which exhibits a second-order electric susceptibility greater than $10^{-9}$ electrostatic units. The medium includes polar aligned dipole subunits. Each dipole subunit has a plurality of noncentrosymmetric molecular dipoles and a connector system. Each molecular dipole has an electron donor moiety, an electron acceptor moiety, and a linking moiety. The linking moiety has a pair of covalent bonds to the connector system. Each molecular dipole has a conjugated π bonding system extending from the electron donor moiety along the linking moiety to the electron acceptor moiety to permit oscillation of the molecular dipole between a ground state and an excited state of differing polarity. The connector system joins the linking moieties to complete a solitary ring or a system of fused rings, which retain the molecular dipoles in substantially parallel relative relation.

It is an advantageous effect of at least some of the embodiments of the invention that the optical article includes a medium having polar aligned dipole subunits in which molecular dipoles are joined together in substantially parallel relative relation.

BRIEF DESCRIPTION OF THE DRAWINGS

FIG. 8 is an alternative form of a second harmonic generating optical article.

FIG. 9 is an optical article for achieving parametric effects.

FIG. 10 is a section taken along section line 10—10 in FIG. 9.

FIG. 11 is an optical article for achieving parametric effects and phase shifting.

DESCRIPTION OF PARTICULAR EMBODIMENTS

Figure 1:
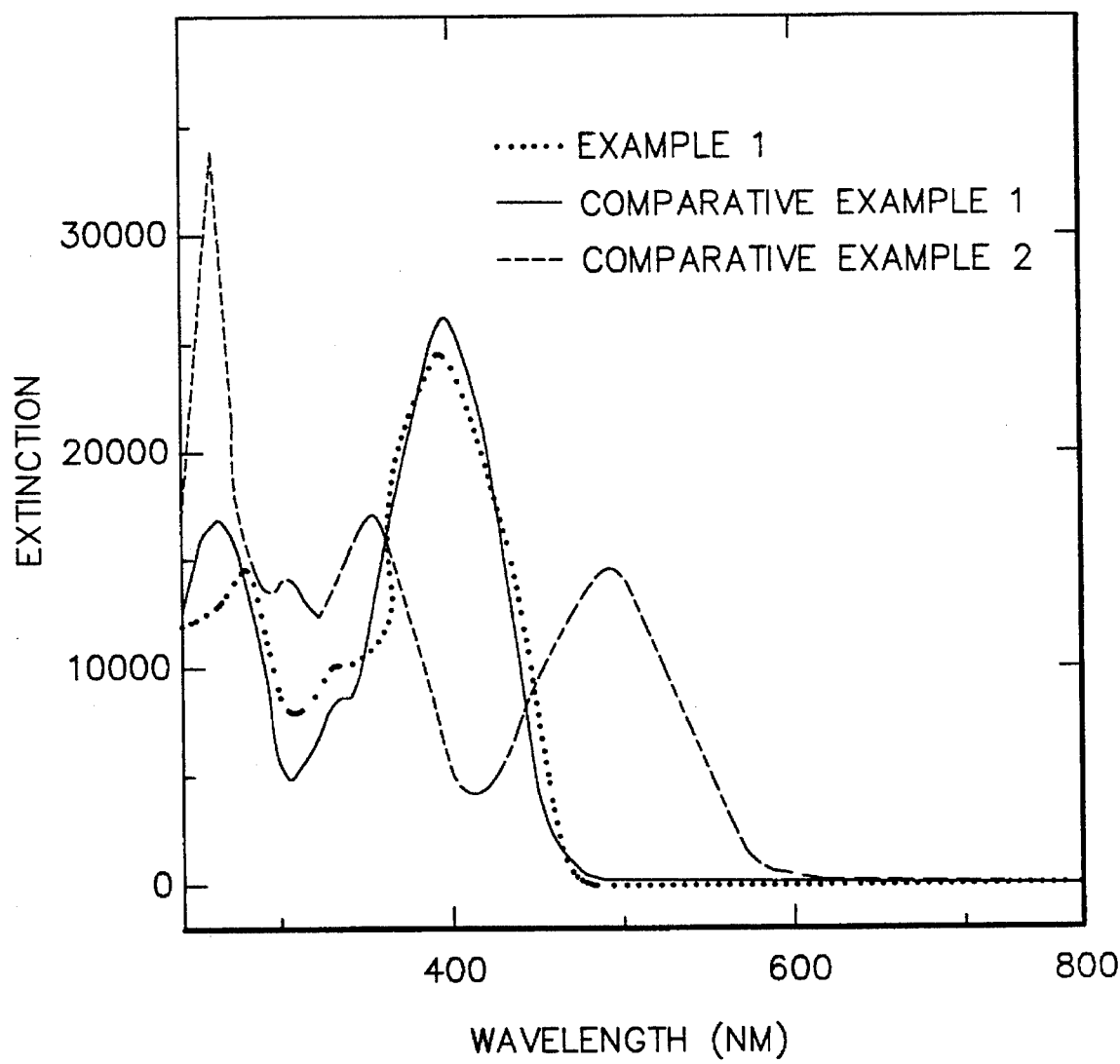
FIG. 1 is a graph of the electronic absorption spectra of the media of Example 1 and Comparative Examples 1 and 2.

The optical article of the invention has an optically active transmission medium that exhibits a high level (about $10^{-9}$ esu) second order (first nonlinear) electric susceptibility as a result of the presence in the medium of dipole subunits, which contain two of more molecular dipoles bound together and correlated and which provide an enhanced $\mu\beta$, where $\mu\beta$, as above, represents the vector product of the molecular ground state dipole moment and the molecular first hyperpolarizability. The individual molecular dipoles, in an uncorrelated state, are capable of exhibiting a $\mu\beta$, of greater than $10^{-48}$ esu. Molecular dipoles exhibiting a lesser $\mu\beta$, could be used, however, such use would be highly undesirable as performance would be greatly impeded.

The molecular dipoles each have the general structure:

where D is an electron donor moiety, L is a linking moiety and A is an electron acceptor moiety. The linking moiety has a conjugated $\pi$ bonding system, which provides a pathway for charge transfer resonance between the electron donor moiety and the electron acceptor moiety. Molecular dipoles in the dipole subunit can be the same or different. Example of suitable molecular dipoles for use in the invention are molecular dipoles represented by the general structure

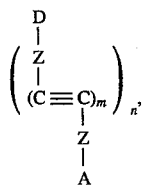

or can be represented by the general structure

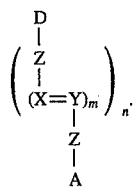

In these formulas, D is an electron donor group and A is an electron acceptor group. Any electron donor and acceptor groups can be used, as long as the donor and acceptor groups do not unacceptably degrade the utility of the dipole subunit, for example, by reacting with each other or other portions of the dipole subunit. For example, D can be $R_2N$, RO, or RS; and A can be $SO_2R$, $SO_2NR_2$, $NO_2$, CN, $CO_2R$, $CF_3$, $CO_2CF_3$, $CH=C(CN)_2$,

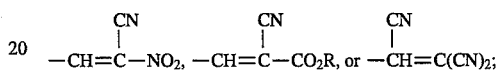

where R is H, or optionally substituted alkylene, cycloalkylene, or arylene. X and Y are CH or N. m is an integer from 0 to 4. n is an integer from 0 to 4. Each Z is independently selected and is a direct link or arylene or heteroarylene. Examples of Z groups are 1,4-phenyl; 1,4-naphthyl; 1,6-naphthyl; 2,5-thiophenyl; and 2,5-pyridyl. Specific examples of suitable molecular dipoles are those disclosed in Cheng, L. T., et al , Journal of Physical Chemistry, Vol 95, (1991), pp. 10631–10643 and Cheng, L. T., et al , Journal of Physical Chemistry, Vol 95, (1991), pp. 10643–10652.

The number of molecular dipoles in the dipole subunit is between 2 and about 8. The number of molecular dipoles present is not strictly limited, however; in order to provide an enhanced $\mu\beta$, the dipole subunit must retain the connected molecular dipoles in relatively rigid and substantially parallel relation. It is undesirable to provide a dipole subunit in which a lack of rigidity offsets an increase in $\mu\beta$ due to the presence of multiple molecular dipoles.

The molecular dipoles of the dipole subunit are joined together in substantially rigid relation by a connector system or connector moiety. The connector system is bonded to the linking moiety of each molecular dipole by a pair of covalent bonds. The general structure of the connector system in combination with the linking moiety is that of a solitary ring or fused ring system. In the simplest examples, the connector system is a pair of direct links between a pair of linking moieties, or has the general structure:

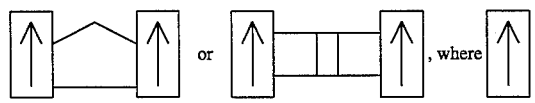

represents a molecular dipole. These two connector systems and other connector systems which join a pair of molecular dipoles are referred to herein as "primary connector systems". A dipole subunit having a primary connector system and a pair of molecular dipoles is referred to herein as a "dimer dipole subunit". A connector system joining together, in a dipole subunit, more than two molecular dipoles, is referred to herein as a "secondary connector system".

Each secondary connector system includes a primary connector system and one or more "multiple dipole groups". In each multiple dipole group, two or more molecular dipoles are bound in fixed and parallel relation by a set of atoms referred to herein as an "addendum moiety". Each addendum moiety can be considered to have a pair of unshared bonds related in the same manner as the bonds joining a molecular dipole to a primary connector moiety in a dimer dipole subunit. Thus, each multiple dipole group can take the place of a molecular dipole in a dipole subunit, in the absence of steric constraints, unfavorable reactions between substituents or the like. An exemplary multiple dipole group, having two molecular dipoles, has the general structure:

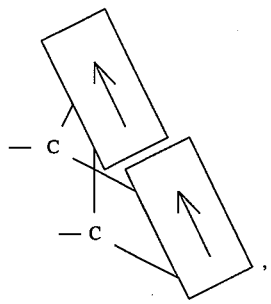

where

represents a molecular dipole.

The following general structures illustrate primary and secondary connector systems:

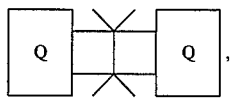

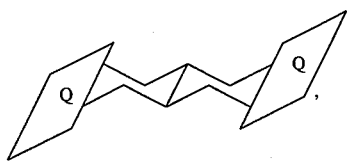

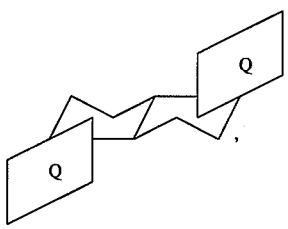

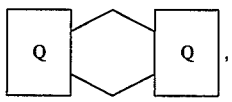

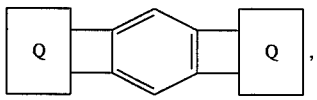

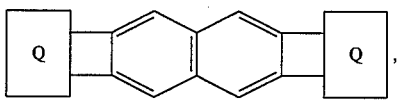

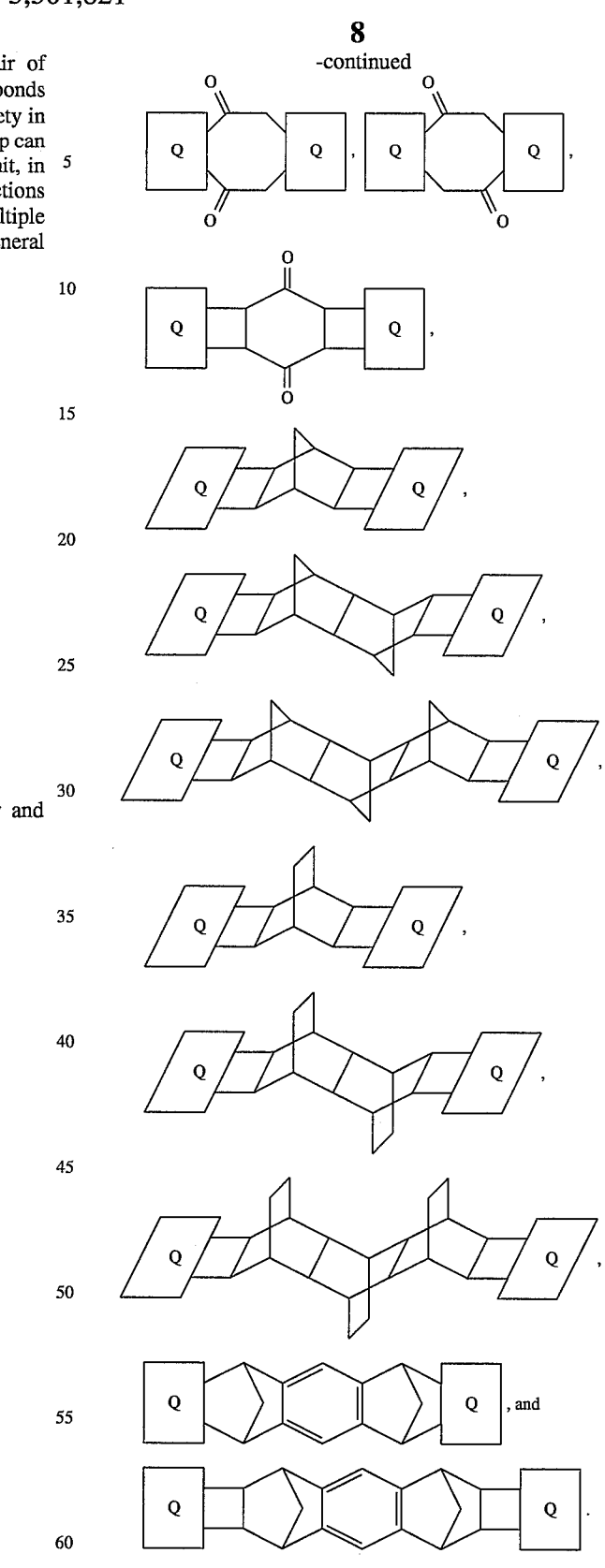

Each

can represent a single molecular dipole, in which case, the structures are dimer dipole subunits. Alternatively, each

can represent a multiple dipole group consisting of an addendum moiety and its associated molecular dipoles. For example, if in one of the above structures, one

is a single molecular dipole and the other is a multiple dipole group having a pair of molecular dipoles, then the dipole subunit has three molecular dipoles and is referred to herein as a trimer dipole subunit.

Some preferred primary connector systems are illustrated by the following dimer dipole subunit general structures:

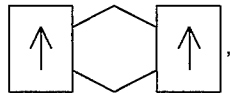

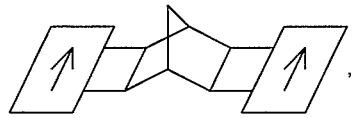

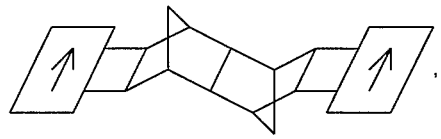

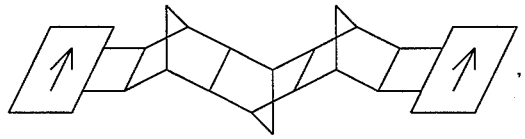

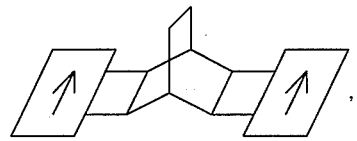

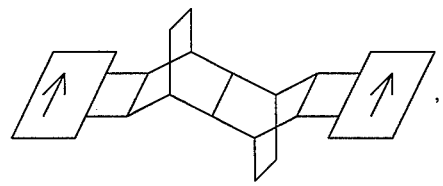

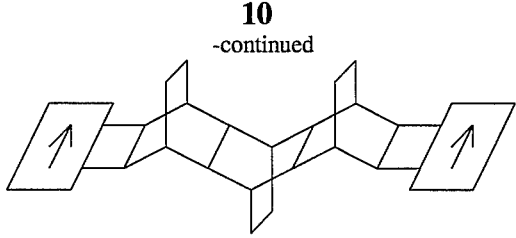

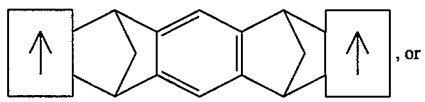

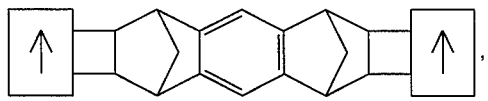

where

represents a molecular dipole.

Connector moieties can bear additional substituents or can have heteroatomic substitution, such as —S—, —N—, —O—, or —P— as long as those substituents are "unreactive", that is, those substituents do not react with any other component of the medium in a undesirable way nor otherwise interfere with the desired characteristics of the medium, for example by interfering with polymerization by steric hindrance or by undesirably shifting the absorption spectrum.

Examples of suitable dipole subunits of the invention include

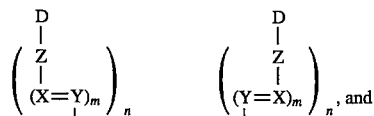

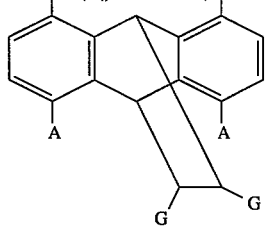

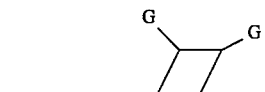

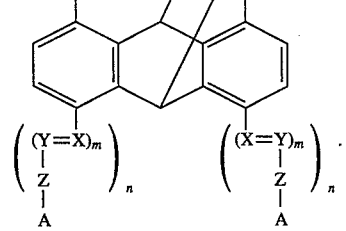

Another example has the general structure

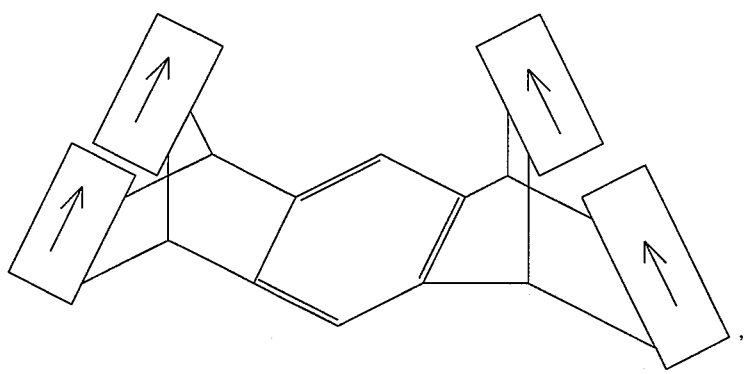
in which, a phenyl ring carbon can be replaced by a heteroatom and the molecular dipoles,
have the general structure
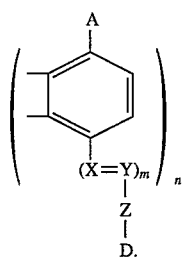
Another example has the structural formula
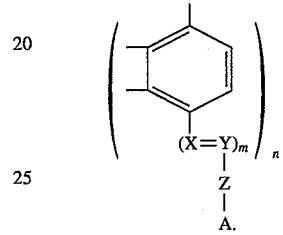
Another example has the structural formula
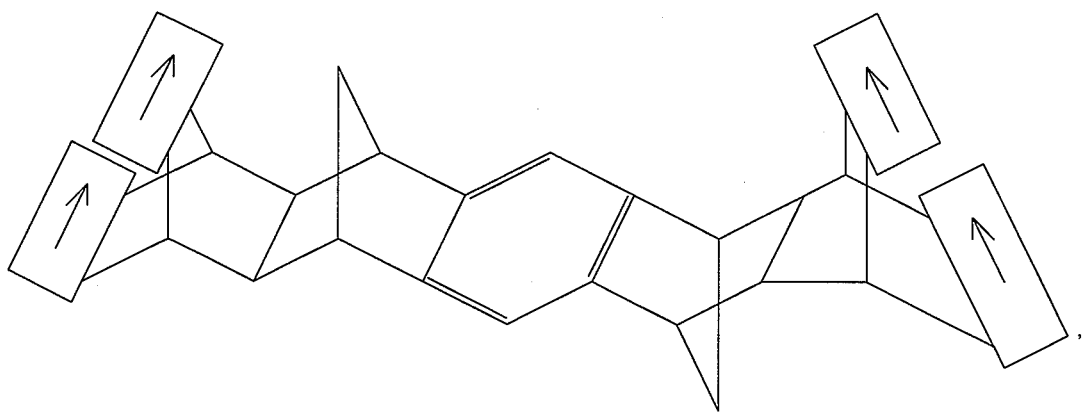
in which the molecular dipoles
have the general structure

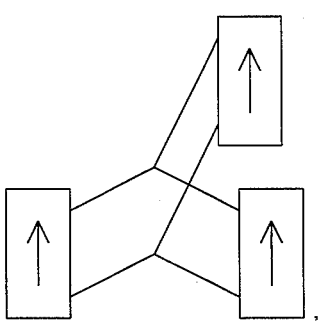

in which the molecular dipoles

have the general structure

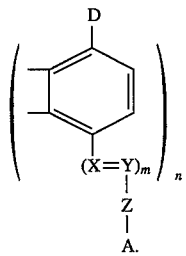

In the structural formulas in the above examples, A, D, Z, m, and n have the same meanings as above-discussed and G represents the same groups as R, as above-discussed, or G represents a point of attachment to another dipole subunit or connector moiety.

The medium and its dipole subunits have substantially the same electronic absorption spectrum as a uncorrelated, equal concentration mixture of the molecular dipoles of the dipole subunits. An explanation for this effect is that the connector moiety interrupts or substantially interrupts $\pi$ conjugation between the molecular dipoles of the dipole subunit, that is the connector moiety has a structure which is not fully conjugated and a conjugated $\pi$ bonding system does not extend from one of the linking moieties along the connector moiety to another linking moiety. As a result, each molecular dipole does not "sense the presence" of the other dipoles, that is, each molecular dipole has an electronic absorption spectrum which is substantially unaffected by the other molecular dipole or dipoles of the dipole subunit.

The dipole subunits have a $\mu\beta$ having a magnitude greater than the sum of the $\mu\beta$'s of an uncorrelated mixture of the molecular dipoles incorporated in the dipole subunits. The Examples and Comparative Examples illustrate this enhancement of $\mu\beta$. In Example 1, the dipole subunit of the medium includes as molecular dipoles:

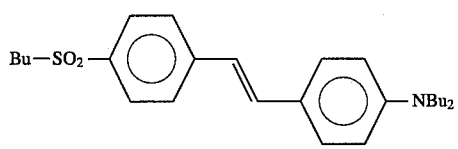

and has a measured $\mu\beta$ of $1400*10^{-48}$. Comparative Example 1 has an uncorrelated mixture of the same molecular dipoles and has a measured $\mu\beta$ of $480*10^{-48}$.

In the Examples and Comparative Examples, values for $\mu\beta$ were determined by electric field induced second-harmonic generation (EFISH). Such EFISH $\mu\beta$ values will differ from actual $\mu\beta$ values on the basis of the inclusion of third order nonlinear optical effects and the exclusion of vector components of second order effects in directions perpendicular to the electric field poling axis. For most NLO materials, including the media of the embodiments of the invention disclosed herein this difference from theoretical values is very slight and can be ignored.

The observed $\mu\beta$ enhancement for the dipole subunits of the medium can be explained by the following. The claimed invention is not, however, limited by any explanation or theory except as specifically claimed.

The high second order (first nonlinear) electric susceptibility of the medium is a result of the presence in the medium of dipole subunits, in which two or more molecular dipoles are retained substantially in parallel. In the dipole subunits, the net dipole moment, $\mu_{ds}$, is a vector sum of the constituent dipole moments. For example, in a dipole subunit having two identical molecular dipoles, this relationship can be expressed by the equation:

$$\mu_{ds} = 2(\mu_{md})\cos(\Theta/2)$$

where $\mu_{md}$ is the net dipole moment of the molecular dipoles and $\Theta$ is the angle between the two vectors and $\mu_{md}$ of the molecular dipoles. In this formula, the largest net dipole moment would be represented by an arrangement of constituent dipole moments in which $\Theta = 0$ degrees and complete cancellation would be represented by an arrangement in which $\Theta = 180$ degrees. Uncorrelated molecular dipoles, that is, dipoles not attached to each other or attached but freely jointed, would provide the same result as an arrangement of constituent dipole moments in which $\Theta = 90$ degrees: no enhancement nor diminution of $\mu\beta$.

The enhanced $\mu\beta$ of the dipole subunits of the medium can be expressed by the following equation:

$$F \simeq \frac{(\mu\beta)_{ds}}{n(\mu\beta)_{md}},$$

in which, F is the enhancement factor, n is the number of molecular dipoles connected together in the dipole subunit, $(\mu\beta)_{md}$ is the $\mu\beta$ for an individual molecular dipole and $(\mu\beta)_{ds}$ is the $\mu\beta$ for the dipole subunit. F is a auger between 0 and n. If there were no correlation between molecular dipoles in the dipole subunit, then F would equal 1. If a pair of molecular dipoles were fixed in an antiparallel relationship, then F would equal 0. As the relative angle between the pair of molecular dipoles goes from 90 degrees to 0 degrees, F approaches n. Equivalent equations for the enhancement factor, F, can be derived for dipole subunits having different molecular dipoles tethered together, which take into account the contribution of each molecular dipole, by replacing the $n(\mu\beta)_{md}$ with the sum of a series of products of the number of dipoles of each type and their respective $\mu\beta$'s.

In the above enhancement factor equation, F is indicated as being substantially equal to $(\mu\beta)_{ds}/n(\mu\beta)_{md}$. The difference between equality and substantial equality is largely due to the difference between actual $\mu\beta$ values and $\mu\beta$ values determined by EFISH.

The optical article of the invention includes, in addition to the medium, structural features necessary to produce a result utilizing second order polarization. These structural features can take a wide variety of forms.

Exemplary optical articles of the invention are presented diagrammatically in FIGS. 4–10.

Figure 4:
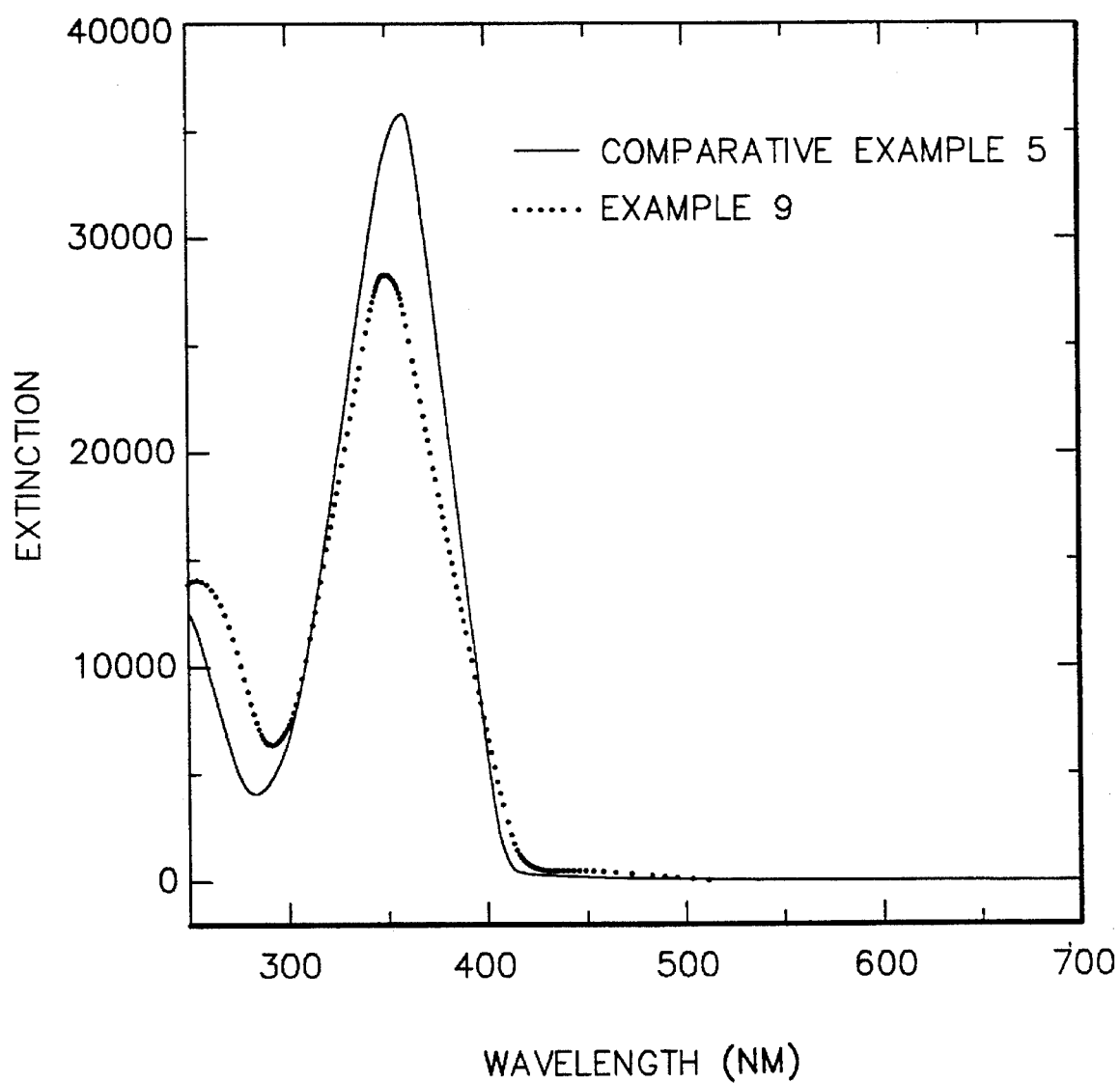
FIG. 4 is a graph of the electronic absorption spectra of the media of Example 5 and Comparative Example 9.

Referring to FIG. 4, the optical article 100 is capable of generating a second harmonic of electromagnetic radiation 101 supplied to it. Incoming electromagnetic radiation is introduced through input means 103, shown as a first prism, into an optically active transmission medium 105 which exhibits a high level (greater than $10^{-9}$ esu) second order or first nonlinear electric susceptibility. Electromagnetic radiation is transmitted through the medium 105 to output means 107, shown as a second prism. In the simplest form of the optical article 100 neither the input nor output prisms are required.

Escape of electromagnetic radiation from the transmission medium 105 can be minimized by locating optional cladding elements 109 and 111 above and below the medium 105. The cladding elements 109, 111 provide physical protection for the medium 105 and can be used to control the wavefront distribution of transmitted radiation. If the cladding layers 109, 111 have the same refractive index, then a symmetrical wavefront distribution results. If the cladding layers 109, 111 have differing refractive indices, then an asymmetrical wavefront distribution exists. Cladding layers 109, 111 can also provide an optical buffer for medium 105 from high refractive index or metal layers, such as electrodes, and thereby reduce attenuation of electromagnetic radiation as it is being guided longitudinally through the device 100.

When the transmission medium 105 is constructed according to the requirements of the invention, at least a portion of the electromagnetic radiation entering the medium 105 will be altered in frequency during its travel through the medium 105, that is, a second harmonic of the input frequency will be generated. The electromagnetic radiation leaving the output means, indicated by arrow 113, exhibits both the original frequency of the input radiation and a second harmonic of this frequency. Although shown by a single arrow, the different radiation frequencies will exit from the prism 107 at divergent angles, and this divergence in exit paths can be relied upon for separation of the electromagnetic radiation into its separate wavelength components. Alternatively, the electromagnetic radiation retaining the original frequency can, if desired, be removed by passing the electromagnetic radiation leaving the article through a filter 115 capable of absorbing radiation of the original frequency while transmitting higher frequency (shorter wavelength) portions of the electromagnetic radiation. By employing one or a combination of filters any broad or narrow frequency band of electromagnetic radiation can be retained in the transmitted output electromagnetic radiation 117.

Figure 5:
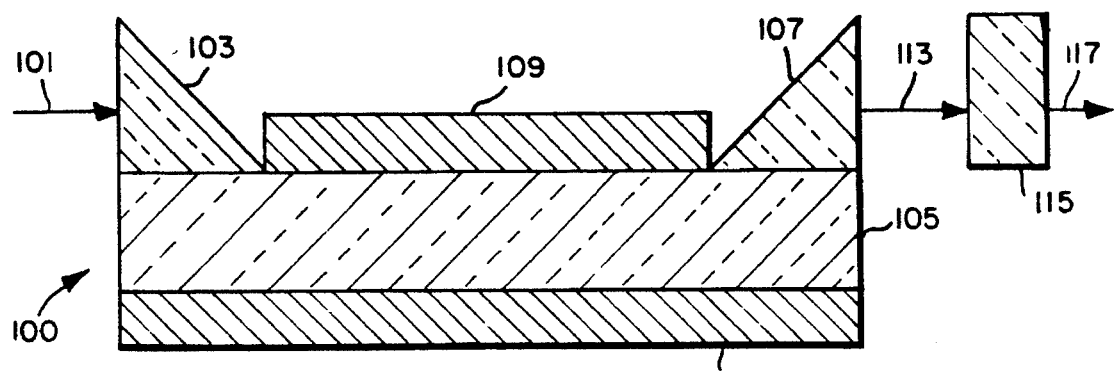
FIG. 5 is a second harmonic generating optical article.

Referring to FIG. 5, an optical article 200 is shown capable of producing a DC potential when electromagnetic radiation 201 is supplied through input means 203, shown as a prism, to optically active transmission medium 205, which can be identical to medium 105, described above. When electromagnetic radiation is being transmitted through the medium 205 a potential difference is produced between upper electrode 207 and lower electrode 209 in electrical contact with the upper and lower surfaces of the transmission medium 205. Electrical conductors 211 and 213 can be used to relay the potential of the upper and lower electrodes 207, 209 to an electronic response unit 215. The electronic response unit 215 can in its simplest form, provide a digital response indicative of the presence or absence of electromagnetic radiation in the transmission medium 205. Alternatively, the electronic response unit 215 can provide an analog response indicative not only of the presence, but also the intensity of electromagnetic radiation in the transmission medium 205. Optical article 200 can be modified to provide a phase shifter by interposing cladding layers similar to those described above between the electrodes 207, 209 and the medium 205. In that case, the effect of the applied potential gradient on the electromagnetic radiation being guided through the optically active transmission medium 205 is to cause light emerging device 200 to be phase shifted as compared to the input beam.

Figure 6:
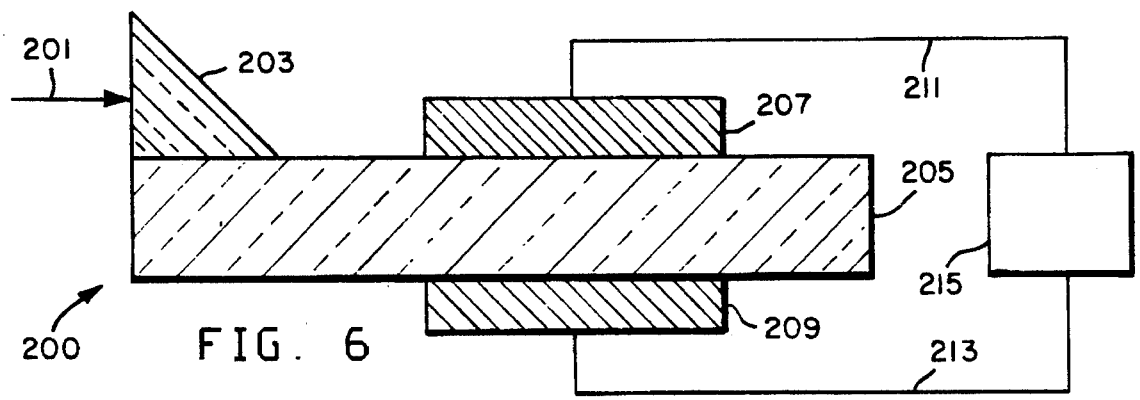
FIG. 6 is a DC signal providing optical article.

Referring to FIG. 6, the optical article 300 is capable of physically displacing a beam 301 of electromagnetic radiation being transmitted through it by applying an electrical potential across optically active medium 305. Application of a DC bias alters the refractive index of the transmission medium 305 when it is formed of a material exhibiting a significant second order susceptibility. This causes the first electromagnetic radiation beam to be refracted at a different angle when the transmission medium is electrically biased, and this changes the first electromagnetic radiation path through the transmission medium. In some instances the refractive index of the transmission medium is increased by the electrical bias and in other instances lowered by the electrical bias, depending upon whether the molecular dipole contained within the transmission medium exhibits a positive or negative first hyperpolarizability. Medium 305, which can be identical to optically active medium 105 or 205, is provided with transparent upper and lower electrodes 307 and 309. Electrodes 307, 309 can, for example, be thin layers of a vacuum vapor deposited metal or metal oxide—e.g., indium tin oxide. Electrodes 307, 309 are connected through conductors 327, 329 to a voltage source 325. An electromagnetic radiation input means, shown as prism 311, is located on upper electrode 307. The electromagnetic radiation passes through the prism 311 as indicated by arrow 313. When the electromagnetic radiation enters medium 305, it follows either path 315a or path 315b. Depending upon which of the two alternative paths are followed, the first electromagnetic radiation either travels along path 317a or 317b upon emerging from lower electrode 309. The paths 315a and 317a together constitute an A path through the optical article while the paths 315b and 317b together constitute a B path through the optical article. Sensing units 319a and 319b are located to receive electromagnetic radiation traveling along the A and B paths, respectively. One of sensing units 319 can be deleted since failure to sense electromagnetic radiation can be employed to indicate that the electromagnetic radiation has shifted to the alternate path.

Figure 7:
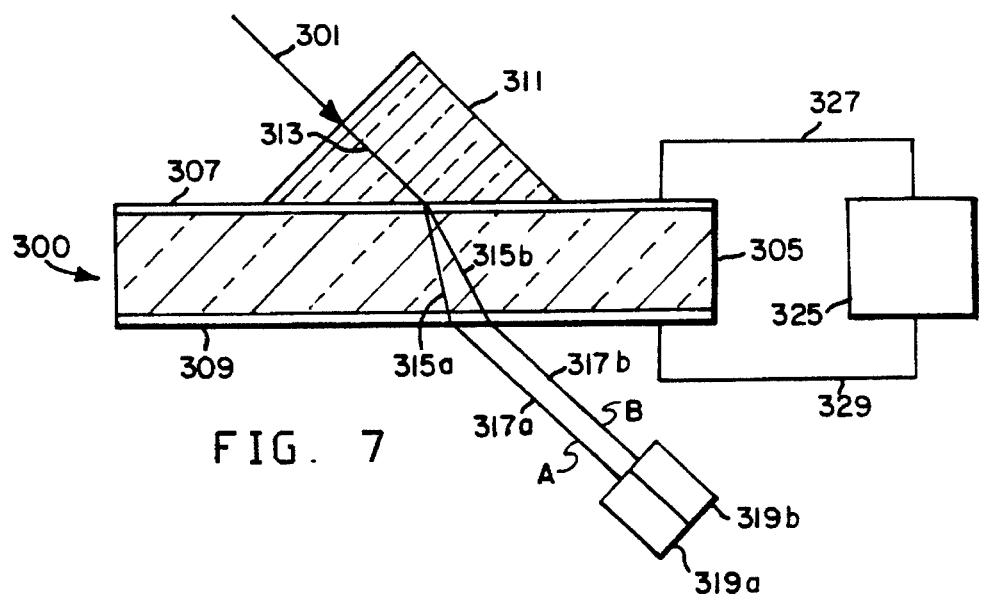
FIG. 7 is an electromagnetic beam displacement optical article.

In FIG. 7 an optical article 400 is shown comprised of a reflective substrate 401 and an optically active transmission medium 403 according to the invention, in the form of a layer overlying substrate 401. Electromagnetic radiation is supplied from a source 405 as indicated by arrow 407. The electromagnetic radiation traverses the optically active transmission medium, is reflected by the substrate, and traverses the optically active transmission medium a second time (not shown). Electromagnetic radiation leaving the optically active transmission medium, indicated by arrow 409, is received by a sensor 411 which is responsive to the second harmonic of the input electromagnetic radiation, but not radiation at the wavelength of the input radiation. Instead of employing a sensor that is selectively responsive to the second harmonic wavelength, separation of the fundamental and second harmonic wavelengths can be undertaken as described above in connection with FIG. 7. The thinner the layer of the optically active transmission medium 403, the higher the intensity of the input electromagnetic radiation must be in order to achieve a given output of second harmonic radiation. In the limiting case, the optically active transmission medium 403 can be a monomolecular oriented molecular dipole layer.

In FIGS. 8 and 9 an optical article 500 according to the invention is shown capable of inducing parametric effects, such as second harmonic generation, by acting on input electromagnetic radiation, indicated by arrow 501. To achieve alteration of the input radiation a transparent optical waveguide 503 of any conventional type is provided having on its external surface a layer of an optically active transmission medium 505 according to the invention, which can have the same properties as the medium 105, described above. The optical waveguide 503 is normally optically passive—that is, exhibits no significant levels of nonlinear (second or third order) polarization. Concentrically surrounding the optically active transmission medium 505 is a cladding layer 507. The waveguide 503 and the cladding layer 507 each have a lower refractive index than the optically active transmission medium 505. As the input electromagnetic radiation 501 traverses the waveguide 503, a portion of the radiation will impinge on the surrounding layer of the optically active transmission medium 505 and be refracted back into the waveguide. Successive impingements of transmitted radiation on the optically active medium 505 result in measurable parametric effects, such as second harmonic generation. The cladding layer 507 is comparable to the cladding layers described in FIG. 7.

In FIG. 10 an optical article 600 is shown capable of producing useful parametric effects similar to optical article 500, but exhibiting a greater capability for better phase matching, such as that desired for improved efficiency second harmonic generation. A substrate 601 is shown supporting superimposed waveguide layers 603, 605, 607, and 609. While four superimposed layers are shown, in practice any odd or even number of superimposed layers can be provided. The odd layers (603 and 607) in the sequence can be formed of an optically active transmission medium according to the invention (similarly as medium 105) while the even layers (605 and 609) can be formed of a passive or linear optical material. Alternatively, the optically active and passive transmission media layers can be reversed in order. In either instance, but particularly in the latter, an option cladding layer 619 similar to cladding layers of FIG. 7 can be provided. To achieve useful parametric effects, electromagnetic radiation, indicated by arrow 611 is supplied to the waveguiding layers through input means 613, shown as a prism. In passing through the waveguiding layers to output means 615, shown as a prism, the optically active and passive media layers together alter the form of the electromagnetic radiation, indicated by output arrow 617, so that parametric (e.g., second harmonic) effects are more efficiently generated.

The optical article of the invention can be prepared in a variety of ways, well known to those skilled in the art. For example, one macroscopic construction approach is to pattern (e.g., spin cast or otherwise suitably shape) a fluid containing the dipole subunits in an unordered state, align (pole) in an externally applied electric field, and convert the fluid to a viscous or solid form capable of holding the dipole subunits in polar alignment when the external field is no longer present. A number of different variations on this general approach are possible.

If desired, the dipole subunits of this invention can be formed into an optically active element by placing the dipole subunits in a transparent polymeric binder, raising the temperature of the binder above its glass transition temperature, externally applying an electric field (also commonly referred to as poling) to align the molecular dipoles of the dipole subunits in the polymer, and then cooling the optically active element below the glass transition temperature of the polymer with the external field still applied. When the external field is removed, the dipole subunits will remain in polar alignment. The specific technique described by Singer, K. D., Sohn, J. E., and Lalama, S. J., Applied Physics Letters, Vol. 49, (1986) pp. 248–250, hereby incorporated by reference, can be employed, wherein poly(methyl methacrylate) is employed as a binder. This technique is generally useful with transparent linear polymers. The term "transparent" is employed throughout, unless otherwise stated, to indicate minimal adsorption of electromagnetic radiation at wavelengths supplied to or generated within the optical articles of this invention. Useful transparent linear polymers can be selected from a wide variety of such polymers known to be useful in the construction of transparent films. Such linear polymers include cellulose nitrate and cellulose esters, such as cellulose triacetate and cellulose diacetate; polystyrene; nylons and polyamides; homo- and co-polymers of vinyl chloride; vinylidine fluoride; polyaldehydes—e.g., poly(vinyl acetal), poly(vinyl butyral), etc.; polycarbonates; homo- and co-polymers of olefins, particularly alpha-olefins, such as polyethylene and polypropylene; polyesters of dibasic aromatic carboxylic acids with divalent alcohols, such as poly(ethylene terephthalate); synthetic rubbers—e.g., homo- and co-polymers of butadiene; high molecular weight alkylene oxides—e.g., ethylene glycols having weight average molecular weights of from 4000 to 4,000,000; poly(vinyl esters)—e.g., poly(vinyl acetate); acrylonitriles and methacrylonitriles; and acrylic and methacrylic acid esters—e.g., poly(methyl metacrylate), poly(methyl acrylate), as well as their copolymers and homologues.

One preferred technique for the macroscopic assembly of the dipole subunits is directly comparable to the assembly of molecular dipoles in polar alignment taught by Scozzafava et al U.S. Pat. No. 4,886,339, the disclosure of which is hereby incorporated by reference. In this technique the dipole subunits are held in polar alignment in a crosslinked polymeric binder to form the optically active transmission medium. The dipole subunits are dissolved in a fluid precursor of the binder, such as a monomer or oligomer capable of polymerizing to form a crosslinked polymer or a linear polymer capable of crosslinking to form a crosslinked binder. The dipole subunits are aligned (poled) in an externally applied DC electric field, and crosslinking is undertaken with the field still applied.

It is an advantage of this approach that it not necessary at any time to heat the materials above ambient temperatures, although mild heating is not incompatible. It is further important to note that the linear polymers employed as binder precursors are to be distinguished from the linear polymers previously employed as binders in the art. Whereas the prior art linear polymer binders must be so highly viscous as to be apparently solid at room temperatures, the linear polymers employed in the practice of this invention as binder precursors can be and preferably are relatively low viscosity liquids at room temperatures. In addition to avoiding any necessity of heating prior to or during poling, the lower molecular weight linear polymers are capable of dissolving higher proportions of the dipole subunits than are the relatively higher molecular weight linear polymer binders of the prior art.

While any convenient technique can be employed for converting the binder precursor into a crosslinked binder, photocrosslinking is preferred. As employed herein the term "photocrosslinking" is employed to designate a reaction stimulated by exposure to electromagnetic radiation that either converts photosensitive monomers into crosslinked polymers or crosslinks linear photosensitive polymers. Useful photosensitive binder precursors capable of producing crosslinked polymeric binders can be chosen from among those employed in conventional negative working photoresist compositions.

In addition to allowing macroscopic assembly, the technique of achieving polar alignment above the glass transition temperature of a polymeric binder followed by cooling exhibits the advantages of permitting a broad choice of dipole subunits, molecular dipoles and linear polymers, including but not limited to liquid crystals. The polymers lend themselves to the formation of thin films by spin casting.

An important disadvantage of macroscopic assembly by dissolving a dipole subunit in a separate polymeric binder is the limited concentration of dipole subunit that can be achieved. Because of the limited solvent capabilities of linear polymers and the risk of phase separation, including as a worst case crystallization of the dipole subunit as a separate phase on cooling, the concentration of the dipole subunit in the binder cannot normally exceed about 20 percent by weight, based on the weight of the binder. A further disadvantage is that ratio of polymeric binder to dipole subunit can vary from one preparation to the next, allowing for performance variances from one optical article to the next, unless this ratio is carefully controlled.

Another preferred technique for the macroscopic assembly of dipole subunits is directly comparable to the assembly of molecular dipoles in polar alignment taught by Robello et al U.S. Pat. No. 4,796,971, the disclosure of which is hereby incorporated by reference. In this technique, the dipole subunits each contain at least one crosslinkable moiety. This permits a separate binder to be eliminated or employed on a optional basis. The dipole subunits are crosslinked while being held in polar alignment in an externally applied field to form a rigid crosslinked polymeric matrix. Suitable crosslinkable moieties include:

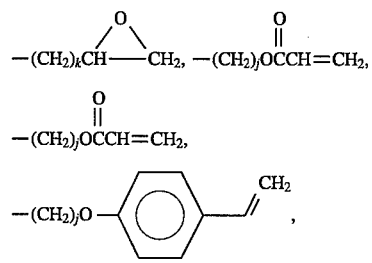

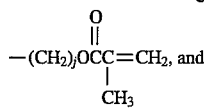

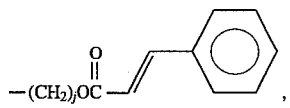

where j is an integer from 2 to 11 and k is an integer from 0 to 11. For the dipole subunits to form a crosslinked polymeric matrix it is necessary that they be linked in polar alignment to at least three adjacent dipole subunits. For this to be achieved each dipole subunit requires at least one crosslinking moiety. Where a single crosslinking moiety is provided for each dipole subunit, the crosslinking moiety must itself be capable of linking at least three adjacent dipole subunits in order to form a crosslinked polymeric matrix.

A particular approach for achieving macroscopic construction of an optically active transmission medium is to employ dipole subunits which each contain two or more photopolymerizable substituent groups joined to the rest of the dipole subunit by optimally flexible linkages. Suitable photopolymerizable substituent groups include:

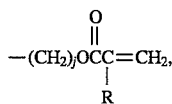

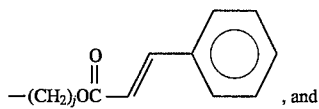

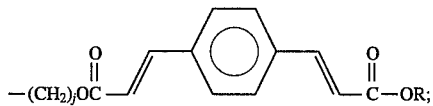

where R and j have the same meanings as above-discussed.

The dipole subunits can take the form of polar aligned pendant groups in linear homopolymers and copolymers. Such polymers having pendant molecular dipoles are the specific subject matter of Robello et al, U.S. Pat. No. 4,796,971. In that technique, from 5 to 100 percent of the repeating units of a vinyl addition polymer can contain repeating units containing a dipole subunit as a pendant group. In one particular form of such a polymer, the linear polymers are copolymers in which from 5 to 35 percent of the repeating units contain a dipole subunit as a pendant group and the repeating units are, for example, styrene, substituted styrene, methylmethacrylate, acrylonitrile and a variety of esters and nitriles of 2-alkenoic acids.

The dipole subunits can be incorporated in all or a portion of main chain repeating units in such condensation polymers as polyurethanes, polyesters, polyamides, polyimides and the like. Suitable repeating units incorporating dipole subunits include the polyester repeating unit having the general formula:

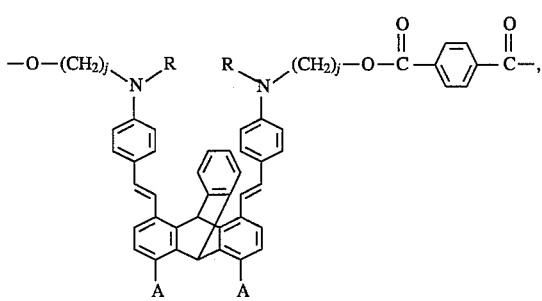

polyurethane repeating units having the general formula:

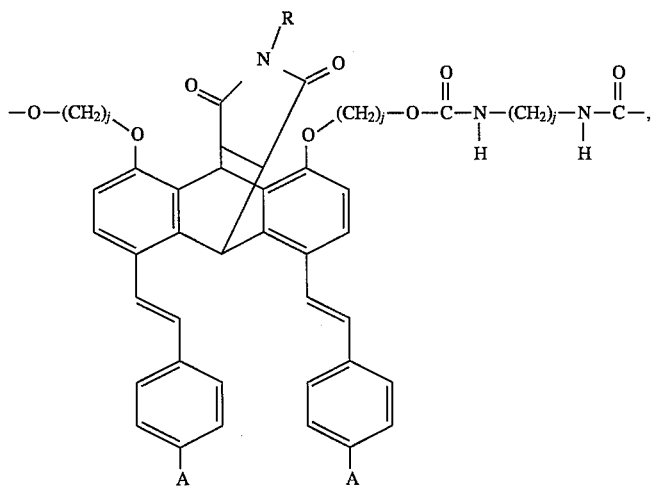

and polyimide repeating units having the general formula:

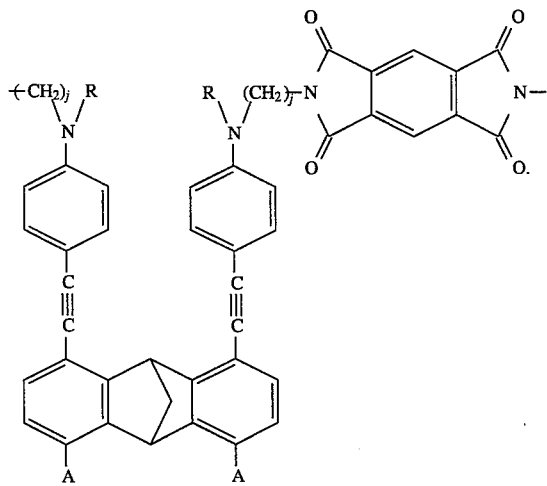

When the optical transmission medium includes a linear polymer, whether including or separate from the dipole subunits, the polymers preferably have molecular weights (weight average, also designated Mw) in the range of from about 10,000 to 200,000, optimally from about 15,000 to 120,000. Polymer molecular weights, unless otherwise indicated are understood to be measured by gel permeation chromotography (GPC) using differential refractive index differential and polystyrene standards. A molecular weight determination procedure of this type is described in detail in "Modern Size Exclusion Chromotography", W. W. Yau, J. J. Kirkland, and D. D. Bly, Wiley Interscience, J. Wiley and Sons, 1979.

The specific selection of materials forming the optically active transmission media will be influenced by the wavelengths of electromagnetic radiation the transmission be used to propagate. The preferred optical articles of this invention are those which exhibit the lowest possible absorptions of electromagnetic radiation in the optically active transmission medium. For optical articles which are intended to propagate a single wavelength or range of wavelengths of electromagnetic radiation, transmission media are employed which exhibit absorption minima within the wavelength region of propagation. Where the optical article itself receives electromagnetic radiation of one wavelength and internally produces for transmission electromagnetic radiation of a differing wavelength, the transmission medium is preferably chosen to exhibit minimal absorptions in both spectral regions. For example, if it is intended to employ an optical article according to this invention for second harmonic generation in response to infrared radiation received from a laser, such as a laser emitting in the 800 to 1600 nm region of the spectrum, the linear polymers are chosen to exhibit the lowest levels of absorption possible at the laser wavelength in the infrared and at the wavelength of the second harmonic in the visible spectrum.

The following Examples and Comparative Examples are presented for a further understanding of the invention. In Example 1 and Comparative Example 1, values of $\mu\beta$ are determined for optical articles including media having dipole subunits and uncorrelated molecular dipoles, respectively. Examples 2–9 do not specifically describe the preparation of optical articles, however, it should be understood that one of skill in the art would prepare optical articles of the invention, in each of those examples in the same manner as described in Example 1.

EXAMPLE 1

The dipole subunit having the general structure

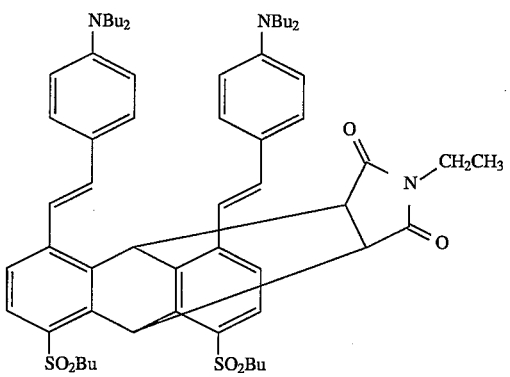

was prepared and μβ was determined for an optical article having a medium including the dipole subunits as follows.

First, 1,8-(Dibutylmercapto)anthraquinone, which has the following structural formula:

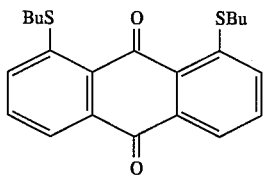

was prepared. 1,8-Dichloroanthraquinone (3 grams, 11 mmol) was mixed with absolute ethanol (20 mL), butanethiol (2.7 grams, 30 mmol), potassium carbonate (4.2 grams, 30 mmol), and manganese dioxide (1 gram, 11 mmol) and heated at reflux overnight. The reaction mixture was then poured onto ice water (100 mL) and the crude orange solid was collected by filtration and air dried. The product was crystallized from ethanol/toluene mixture (20:80 volume/volume) and hot filtered to remove black inorganic solid. Yield was 3.3 grams of orange-red crystals, which was 78 percent of theoretical. Melting point was determined to be 130°–132° C. Proton nuclear magnetic resonance (NMR) was performed on a GE QE-300 300 MHz instrument using deuterated dimethylformamide (DMF-$d_7$) gave the following peaks (in parts per million (ppm)) δ: 0.95 (t, J=7.3, 6H), 1.52 (m, 4H), 1.71 (m, 4H), 3.02 (t, J=7.3, 4H), 7.77 (t, J=7.7, 2H), 7.86 (d, J=7.8, 2H), 7.95 (t, 2H). Field desorption mass spectrometry (FDMS) provided a value of m/e 384 (M+).

Then 1,8-(Dibutylmercapto)anthrone, having the structural formula:

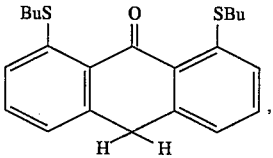

was prepared. A mixture of 1,8(dibutylmercapto)anthraquinone (40 grams, 100 mmol) and tin metal (60 grams, 500 mmol) were stirred in refluxing glacial acetic acid (150 mL) for two hours. Concentrated HCl (50 mL) was added to the reaction solution, the solution was cooled to room temperature, and the excess tin was filtered off. The acidic solution was poured onto water and extracted with dichloromethane, (3 times, 75 mL each). The organic layers were combined, washed with sodium bicarbonate solution, dried with $Na_2SO_4$, and concentrated at reduced pressure. Crystallization from ethanol yielded 32 grams of yellow platelets, which was 86 percent of theoretical yield. Melting point was determined to be 117°–119° C. Proton NMR performed as in the preceding preparation using $CDCl_3$ gave the following peaks (in parts per million (ppm)) δ: 0.96 (t, J=7.3, 6H), 1.53 (m, 4H), 1.74 (m, 4H), 2.91 (t, J=7.3, 4H), 4.29 (s, 2H), 7.07 (d, J=7.3, 2H), 7.25 (t, 2H), 7.37 (t, J=7.8, 2H). FDMS m/e 370 (M+).

Then 1,8-(dibutylmercapto)anthracene, having the structural formula:

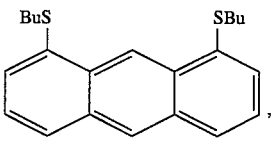

was prepared. 1,8-(Dibutylmercapto)anthrone (1.9 grams, 5.1 mmol) and excess sodium borohydride (1.9 grams, 50 mmol) were stirred in refluxing isopropyl alcohol, under nitrogen, for 18 hours. The solution was cooled to approximately 5° C with an ice bath, acidified carefully with 10% HCl, and extracted with dichloromethane (80 mL). The organic layer was washed with sodium bicarbonate solution, dried with $Na_2SO_4$, and concentrated at reduced pressure. The crude solid was chromatographed on silica gel, using ligroin/$CH_2Cl_2$ (50 volume %/50 volume %) as eluent. Crystallization from ethanol/toluene yielded 1.1 grams of yellow powder, which was a yield of 60 percent of theoretical yield. Melting point was determined to be 59°–61° C. Proton MR was performed as described above; $^1$H MR ($CDCl_3$) δ: 0.96 (t, J=7.3, 6H), 1.54 (m, 4H), 1.74 (m, 4H), 3.1 (t, J=7.3, 4H), 7.40 (t, 2H), 7.55 (d, J=6.7, 2H), 7.86 (d, J=8.4, 2H), 8.41 (s, 1H), 9.53 (s,1H). FDMS m/e 354 (M+).

Then 1,8-(dibutylmercapto)-4,5-(chloromethyl)anthracene, having the structural formula:

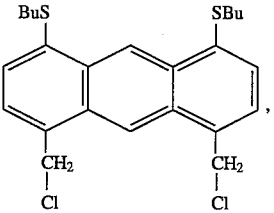

was prepared. Dimethomethane (7.6 grams, 100 mmol) was dissolved in dichloroethane (about 50 mL) and was then added to a solution of aluminum chloride (21.3 grams, 160 mmol) suspended in dry dichloroethane (about 50 mL) at 0° C, under nitrogen. A white precipitate formed as the solution was stirred for 20 minutes. As the solution was cooled to about 0° C, 1,8-(dibutylmercapto)anthracene (13 grams, 37 mmol), dissolved in minimal dichloroethane (approx. 100 mL), was added over the period of one hour. The reaction solution was then allowed to warm to room temperature and maintained at that temperature overnight. The homogeneous solution was then poured onto about 300 grams of ice water, and extracted with dichloromethane. The organic layer was washed with saturated NaCl solution, dried with $Na_2SO_4$, and concentrated at reduced pressure. The crude product was crystallized from toluene to leave 10 gram of yellow plates, which was a yield of 60 percent of theoretical yield. Melting point was determined to be 135°–137° C. Proton NMR was performed as described above; $^1$H NMR ($CDCl_3$) δ: 0.96 (t, J=7.3, 6H), 1.54 (m, 4H), 1.75 (m, 4H), 3.08 (t, J=7.3, 4H), 5.15 (s, 4H), 7.42 (AB, $J_{AB}$=7.3, Δv=21.4, 4H), 8.90 (s, 1H), 9.49 (s, 1H). FDMS m/e 450 (M+).

Then 1,8(dibutylmercapto)-4,5-(methyldimethylphosphono)anthracene, having the structural formula:

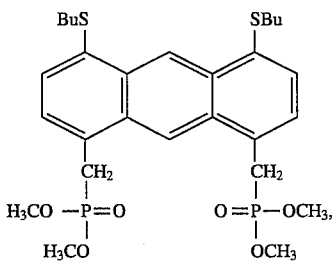

was prepared. 1,8-(Dibutylmercapto)-4,5-(chloromethyl)anthracene (10.0 grams, 22 mmol) was dissolved in trimethylphosphite (100 mL), under nitrogen, and refluxed overnight. Excess trimethylphosphite was removed at reduced pressure to leave a brown oil which solidified upon standing. Crystallization from isopropanol/heptane yielded 6.1 grams of yellow powder which was 46 percent of theoretical yield. Melting point was determined to be 97°–99° C. Proton NMR was performed as described above; $^1$H NMR (CDCl$_3$) δ: 0.93 (t, J=7.3, 6H), 1.52 (m, 4H), 1.71 (m, 4H), 3.06 (t, J=7.3, 4H), 3.63 (d, J=10.8, 12H), 3.78 (d, J=22.1, 4H), 7.42 (m, 2H), 7.47 (d, 2H), 9.03 (s, 1H), 9.53 (s, 1H). FDMS m/e 598 (M+).

Then 1,8(dibutylsulfonyl)-4,5-(methyldimethylphosphono) anthracene, having the structural formula:

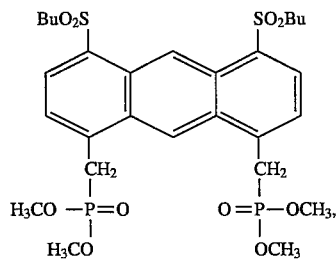

was prepared. 1,8(Dibutylmercapto)-4,5-(methyldimethylphosphono) anthracene (6.6 grams, 11 mmol) was dissolved in glacial acetic acid (100 mL) and hydrogen peroxide (6.3 grams, 55 mmol) was added as a 30% (weight/volume) water solution. The resulting mixture was refluxed for 2 hours, cooled to room temperature, and evaporated to dryness at reduced pressure to provide 7 grams of viscous oil at a theoretical yield of 96 percent. This product was used without further purification. Proton NMR was performed as described above; $^1$H NMR (CDCl$_3$) δ: 0.85 (t, 6H), 1.40 (m, 4H), 1.73 (m, 4H), 3.55 (m, 4H), 3.70 (d, J=11.0, 12H), 3.95 (d, J=23.0, 4H), 7.62 (m, 2H), 8.33 (d, J=7.3, 2H), 9.48 (s, 1H), 10.06 (s, 1H). FDMS m/e 662 (M+).

Then 1,8-(dibutylsulfonyl)-4,5-{(4'-dibutylamino)styrl}anthracene, having the structural formula:

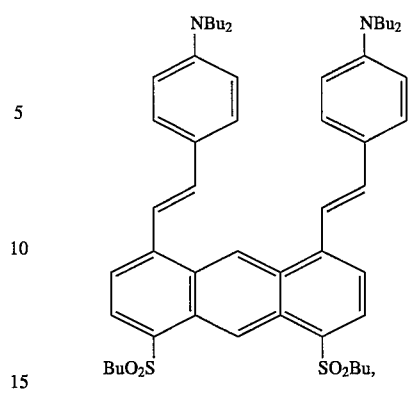

was prepared. 1,8(Dibutylsulfonyl)-4,5-(methyldimethylphosphono) anthracene (2.0 grams, 3 mmol) was added, under nitrogen, to a stirred mixture of 4-dibutylaminobenzaldehyde (1.7 grams, 7.5 mmol) and dry ethlene glycol dimethyl ether (40 mL), and 60 percent (weight/volume) dispersion of sodium hydride (240 mg, 8 mmol). The mixture was heated at reflux for 6 hours, then was cooled, and poured into concentrated ammonium chloride solution. The crude product was extracted into 100 mL of methylene chloride, washed well with water, dried with sodium sulfate, and concentrated at reduced pressure to leave a red oil. Crystallization from ethanol yielded 1.5 grams of orange solid which was 57 percent of theoretical yield. Melting point was determined to be 153°–155° C. Proton NMR was performed as described above; $^1$H NMR (CDCl$_3$) δ: 0.86 (t, J=7.3, 6H), 0.97 (t, J=7.3, 12H), 1.4 (m, 12H), 1.60 (m, 8H), 1.75 (m, 4H), 3.33 (t, J=7.3, 8H), 3.59 (t, J=7.9, 4H), 7.11 (AB, J$_{AB}$=8.7, 8H), 7.55 (AB, J$_{AB}$=15.8, 4H), 7.84 (d, J=7.6, 2H), 8.37 (d, J=7.6, 2H), 9.39 (s, 1H), 10.0 (s, 1H). FDMS m/e 876 (M+).

Finally the N-ethylmaleimide adduct, which is the dipole subunit and has the structural formula:

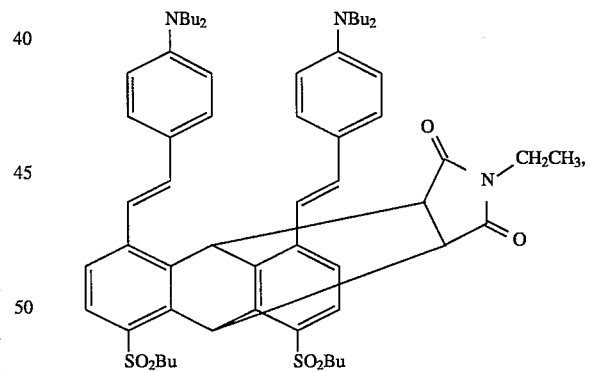

was prepared as follows. 1,8-(Dibutylsulfonyl)-4,5-{ (4'-dibutylamino)styrl} anthracene (1 gram, 1.1 mmol) and N-ethylmaleimide (150 mg, 1.2 mmol) were dissolved in toluene (25 mL) and refluxed overnight. The solution was cooled to room temperature and concentrated to dryness at reduced pressure. The crude solid was chromatographed on silica gel, using 10% (volume/volume) ethyl acetate in methylene chloride as eluent. Crystallization from ethanol yielded 670 mg of yellow solid which was 61 percent of theoretical yield. Melting point was determined to be 184°–186° C. Proton NMR was performed as described above; $^1$H NMR (CDCl$_3$) δ: 0.48 (t, 3H), 0.88–1.01 (m, 18H), 1.26–1.96 (m, 26H), 3.07–3.80 (m, 16H), 5.96 (d, J=3.2, 1H), 6.49 (d, J=8.7, 2H), 6.65 (d, J=8.7, 2H), 7.02 (m, 2H), 7.12 (d, J=16.0, 1H), 7.25 (d, J=16.0, 1H), 7.33 (d, J=8.7, 1H), 7.43 (d, J=16.0, 1H), 7.52 (d, J=8.5, 2H), 7.61 (d, J=8.5, 1H), 7.77 (m, 2H). FDMS m/e 1001 (M+).

Electric-field-induced second-harmonic generation (EFISH) measurements were made of μβ for an optical article containing a medium including, as the dipole subunit, the N-ethylmaleimide adduct:

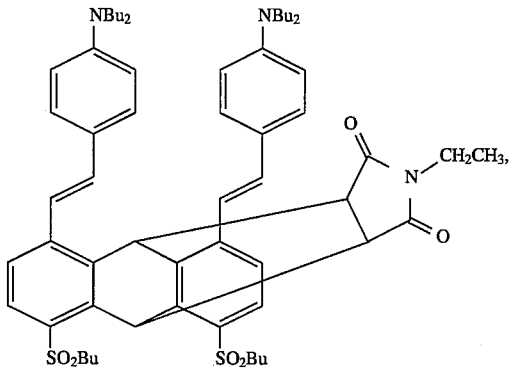

using the technique described in "New Sulfonyl-Containing Materials for Nonlinear Optics: Semiempirical Calculations, Synthesis, and Properties", Ulman, A. et al, Journal of the American Chemical Society, (1990), Vol. 112, pp 7083–7090. In following that procedure, a pure chloroform standard and a series of solutions of the N-ethylmaleimide adduct in chloroform were prepared. The solutions were individually placed in a wedge-shaped sample cell exactly as described in the Ulman et al reference cited immediately above. Pulses of 1064 nm light of 10 nanosecond duration from a 10-pps Quanta Ray DCR Nd:YAG laser were focused into a 1 meter path length cell containing 400 psi (27.6 bar) hydrogen gas. The 1907 nm light pulses generated through stimulated Raman scattering were recollimated and separated from the input beam by using a dispersing prism. The 1907 nm beam was then passed through a half-wave plate/polarizer combination to control the polarization and light intensity, and then the beam was lightly focused into the sample cell synchronous to the application of a high voltage pulse of approximately 20 kV/cm. The energy incident on the sample was maintained below 5 mJ per pulse. The 953 nm second harmonic light produced was separated from the fundamental by an interference filter and measured by using a photomultiplier tube and gated integrator. The second harmonic intensity was monitored while translating the sample cell perpendicular to the beam. The resulting Maker fringes were numerically fitted to a sine function to find their amplitude and period. $\Gamma_{EFISH}$ for each solution was calculated using the equation:

$$\Gamma_{EFISH} = \frac{\text{sq. rt. } A}{PV}$$

where sq.rt. A is the square root of the amplitude, P is the period, and V is the voltage applied to the cell. The values of concentration, amplitude, period, voltage, and $\Gamma_{EFISH}$ are compiled in Table I.

Least squares analysis was used to determine the slope m and the intercept b for a plot of $\Gamma_{EFISH}$ versus solution concentration. μβ was calculated using the equation:

$$\mu\beta = \frac{m5kTM\Gamma_{EFISH}}{bLf_0f_{2\omega}f_\omega^2}$$

where M is the molecular weight of the molecule being measured and L is Avagadro's number. The local field factors are given by:

$$f_0 = \frac{(n_\omega^2 + 2)\epsilon}{n_\omega^2 + 2\epsilon}$$

$$f_{2\omega} = (n_{2\omega}^2 + 2)/3; \text{ and}$$

$$f_\omega = (n_\omega^2 + 2)/3;$$

where $\epsilon$ is the solution dielectric constant (1 kHz) and $n_\omega$ and $n_{2\omega}$ are the solution indices of refraction at frequencies $\omega$ and $2\omega$, respectively.

An absorption spectrum was recorded using a Perkin-Elmer Lambda 7 Spectrometer as a $10^{-5}$ Molar solution in chloroform and is graphed in FIG. 1.

EXAMPLE 2

The dipole subunit having the general structure

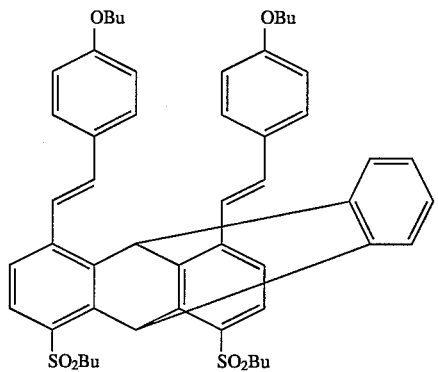

was prepared as follows.

First, 1,8-(dibutylsulfonyl)-4,5-{(4'-butoxybenzene)stryl)anthracene, which has the structural formula:

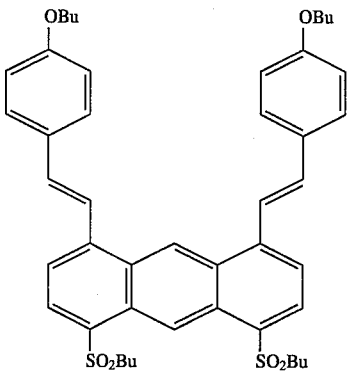

was prepared. 1,8(Dibutylsulfonyl)-4,5-(methyldimethylphosphono) anthracene (3.5 grams, 5 mmol), prepared as described above in Example 1, was added, under nitrogen, to a stirred mixture of 4-butoxybenzaldehyde (1.0 grams, 5.6 mmol) and dry ethylene glycol dimethyl ether (50 mL) and 60 percent (weight/volume) dispersion of sodium hydride (330 mg, 11 mmol). The mixture was heated at reflux for 6 hours, then was cooled, and poured into concentrated ammonium chloride solution. The crude product was extracted into 100 mL of dichloromethane, washed well with water, dried with sodium sulfate, and concentrated at reduced pressure. Crystallization from ethanol/toluene (20 parts/80 parts) yielded 3.0 grams of yellow solid which was 78 percent of theoretical yield. Melting point was determined to be 250°–252° C. Proton NMR was performed as described in Example 1, $^1$H NMR (CDCl$_3$) δ: 0.87 (t, J=7.3, 6H), 1.02 (t, J=7.3, 6H), 1.45 (m, 4H), 1.53 (m, 4H), 1.79 (m, 8H), 3.59 (t, J=7.8, 4H), 4.04 (t, J=6.4, 4H), 7.27 (AB, JAB=8.5, 8H), 7.33 (d, J=16, 2H), 7.84 (m, 4H), 8.40 (d, J=7.5, 2H), 9.39 (s, 1H), 10.1 (s, 1H). FDMS m/e 766 (M+).

Then, 1,8-(dibutylsulfonyl)-4,5-{(4'-butoxybenzene)styrl}anthracene (2 gram, 2.6 mmol) and isopentyl nitrite (300 mg, 2.6 mmol) were dissolved in ethylene glycol dimethyl ether (40 mL). The mixture was warmed slightly and 1.7 grams (32 mmol) of anthranilic acid was added over 30 minutes as a solution in 40 mL of ethylene glycol dimethyl ether. The mixture was refluxed overnight. The solution was cooled to near 5° C and treated with 20 mL of ethanol plus 10 mL of 50 percent sodium hydroxide solution in water. The product was extracted into dichloromethane, dried over Na$_2$SO$_4$, and chromatographed on silica gel using 5% acetone/95% dichloromethane as solvent. The product was recrystallized from ethanol/toluene (20%/80%), to yield 0.36 grams which was 33 percent of theoretical. Melting point was determined to be 253°–255° C.

Proton NMR was performed as described in Example 1; $^1$H NMR (CDCl$_3$) δ: 0.85 (t, J=7.3, 6H), 1.02 (t, J=7.3, 6H), 1.35–1.84 (m, 18H), 3.37 (m, 4H), 4.01 (t, J=6.4, 4H), 6.49 (s, 1H), 6.85 (d, J=8.6, 4H), 7.08 (m, 4H), 7.43 (m, 5H), 7.54 (d, J=16.1, 2H), 7.60 (d, J=6.7, 1H), 7.66 (d, J=8.4, 2H), 7.80 (s, 1H).

Figure 2:
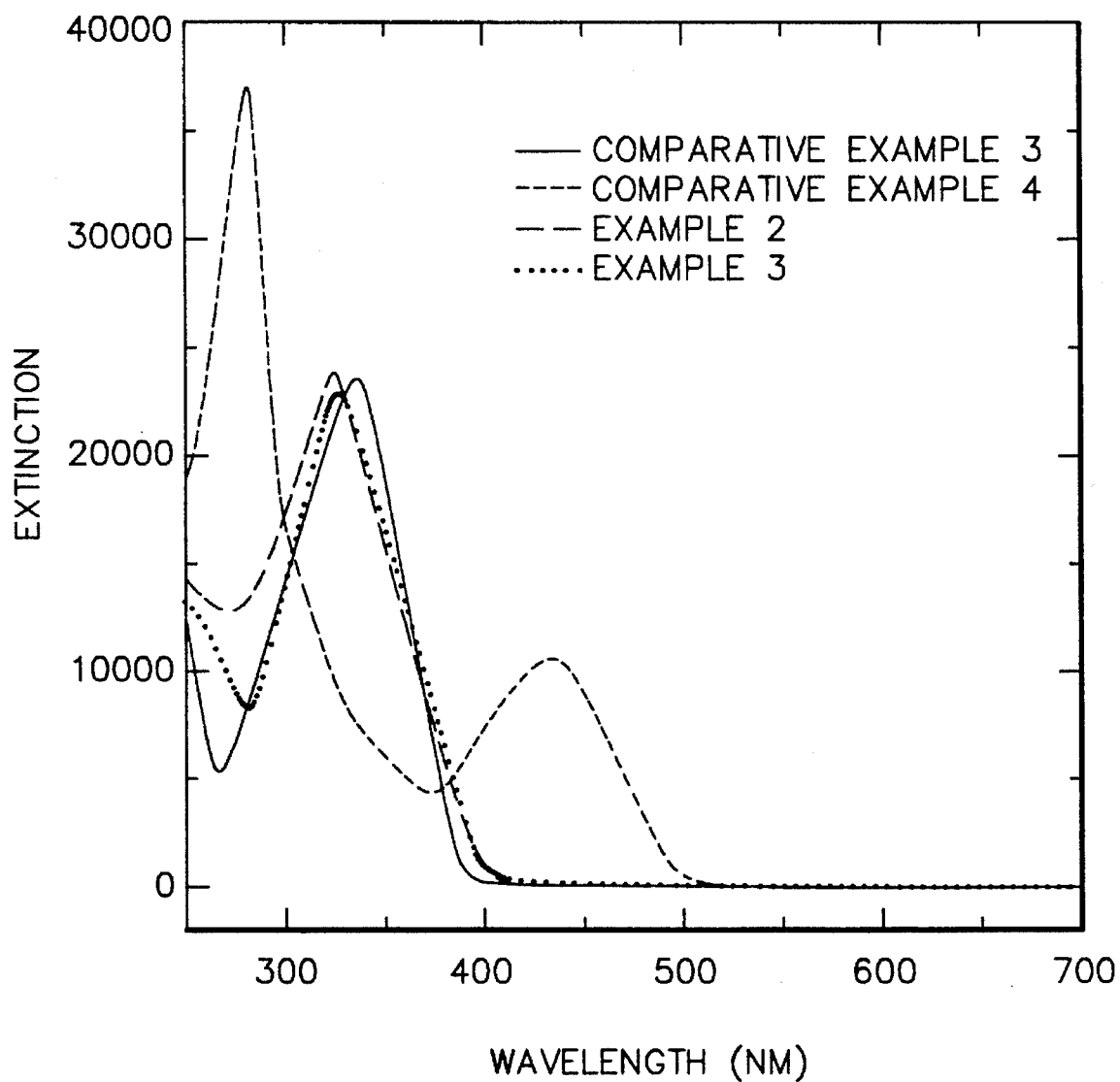
FIG. 2 is a graph of the electronic absorption spectra of the media of Examples 2 and 3 and Comparative Examples 3 and 4.

An absorption spectrum was taken in the same manner as in Example 1 and is graphed in FIG. 2.

EXAMPLE 3

The dipole subunit having the general structure

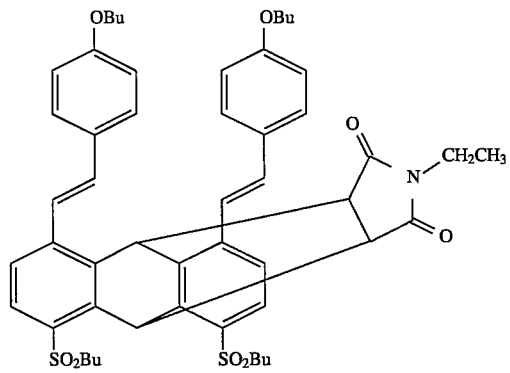

was prepared as follows.

1,8-(Dibutylsulfonyl)-4,5-{(4'-butoxybenzene)styrl} anthracene (2 gram, 2.6 mmol), prepared as described in Example 2, and N-ethylmaleimide (375 mg, 3 mmol) were dissolved in toluene (40 mL) and refluxed overnight. The solution was cooled to near 0° C. and precipitate produced was collected by filtration. Crystallization from toluene yielded 1.9 grams of a white solid which was 82 percent of theoretical yield. Melting point was determined to be 221°–223° C. Proton NMR was performed as described above; $^1$H NMR (CDCl$_3$) δ: 0.51 (t, 3H), 0.89–1.05 (m, 12H), 1.45–1.99 (m, 17H), 3.11–3.26 (m, 3H), 3.44–3.71 (m, 5H), 3.95 (t, J=6.4, 2H), 4.03 (t, J=6.4, 2H), 5.91 (d, J=3.2, 1H), 6.68 (d, J=8.6, 2H), 6.92 (d, J=8.6, 2H), 7.0 (m, 3H), 7.3 (m, 3H), 7.54 (m, 4H), 7.80 (t, J=8.4, 2H). FDMS m/e 891 (M+).

An absorption spectrum was taken in the same manner as in Example 1 and is graphed in FIG. 2.

EXAMPLE 4

Anti-1,4,5,8-tetrahydroanthracene-1,4:5,8-diendoxide was prepared as described in Hart, H., et al, Tetrahedron, Vol. 43, (1987), pp 5203–5223, which states at footnote 4: "To a stirred solution of [1,2,4,5-tetrabromobenzene] (39.4 g, 0.1 mol) and furan (120 mL, freshly distilled) in dry toluene (1400 mL) at −23° C. under argon was slowly added (5 h) BuLi (0.22 mol in 150 mL hexane). After addition, the mixture was allowed to warm to rt and stirred overnight. Water (20 mL) was added and the mixture was stirred vigorously for 20 min. The organic layer was washed with water (150 mL×2), dried (MgSO$_4$) and the solvent removed (rotavap). The resulting gummy yellow solid was pumped to dryness. Methanol (70 mL) was added and the off-white crystals were collected and washed with a small amount of methanol. Recrystallization from acetone gave white plates of [Anti-1,4,5,8-tetrahydroanthracene-1,4:5,8-diendoxide]."

Figure 3:
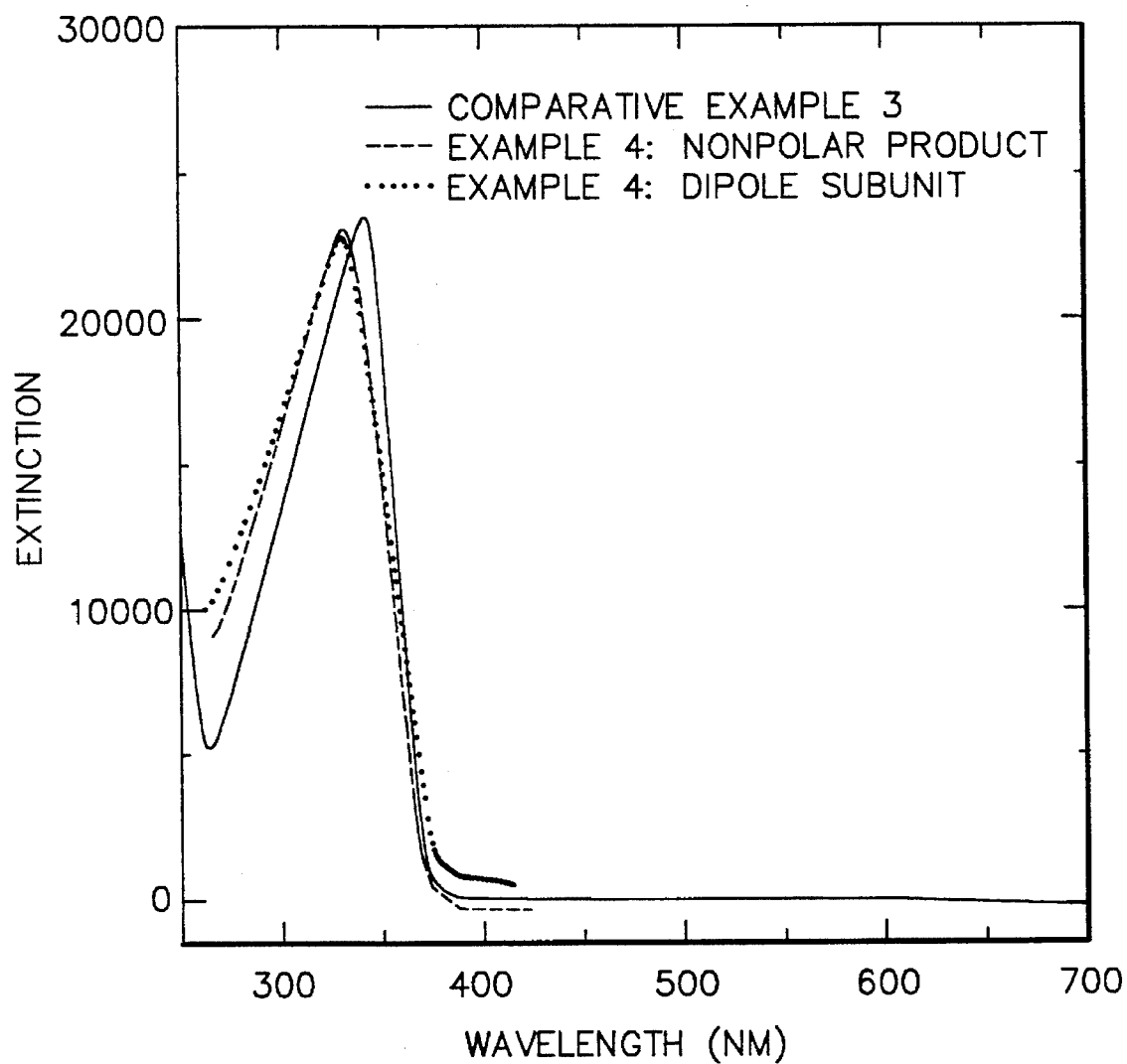
FIG. 3 is a graph of the electronic absorption spectra of the media of Example 4 and Comparative Example 3.

A mixture of Anti-1,4,5,8-tetrahydroanthracene-1,4:5,8-diendoxide (0.13 g, 0.65 mmol), 1.0 grams of anthracene dimer having the general structure:

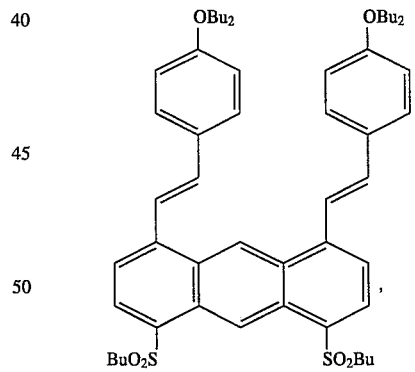

and 20 mL of xylenes was heated at reflux for 24 hours, then cooled to room temperature. The precipitated product was collected by filtration and dried. FDMS gave a value of 1742 m/e (M+). The polar form of the product, which is a tetramer dipole subunit, and has the structural formula:

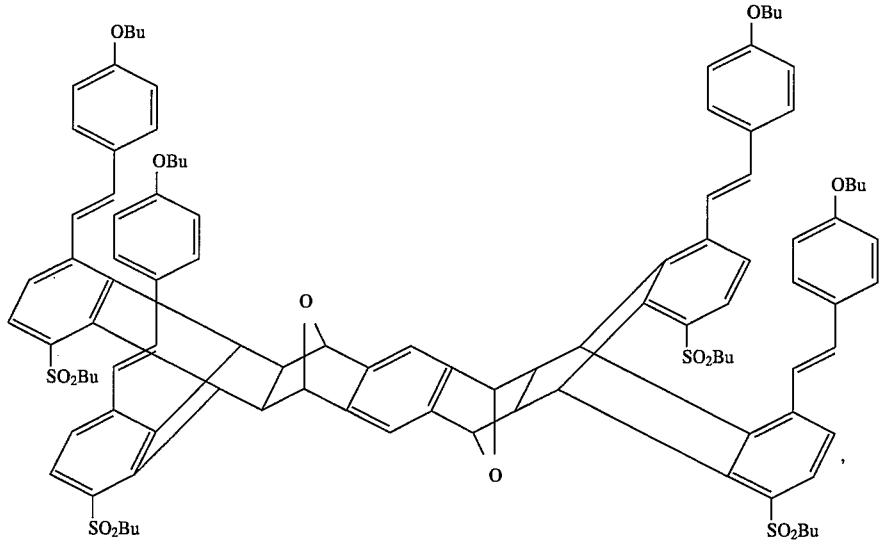

was separated from the nonpolar product, which has the structural formula:

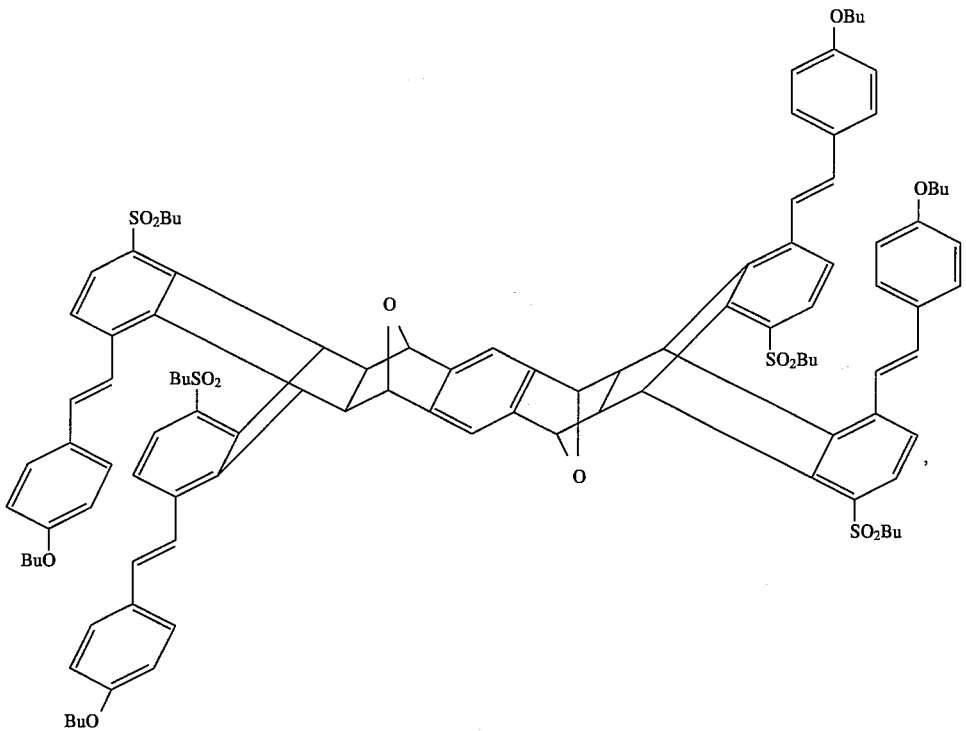

by high performance liquid chromotography using a DuPont SB-CN 11 cm column and hexanes/dichloromethane eluent under gradient conditions (1–100% dichloromethane over 25 minutes). Ultraviolet absorption spectra of the tetramer dipole subunit and the nonpolar product were obtained in the same manner as in Example 1, and are shown in FIG. 3.

EXAMPLES 5–6

A suspension of 1,8-dihydroxyanthraquinone (35.0 g, 0.14 mol), butyltosylate (93 g, 0.6 mol), and sodium carbonate (38 g, 0.36 mol) in 700 mL of o-dichlorobenzene was heated at reflux for 6 days. The mixture was cooled to room temperature, filtered, and the solvent was removed by steam distillation. The residue was recrystallized from isopropanol to provide 38.1 g (74% yield) of 1,8-dibutoxyanthraquinone, which has the structural formula:

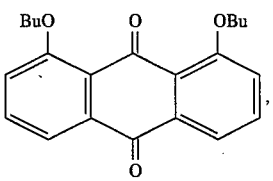

A mixture of 1,8-dibutoxyanthraquinone (38 g, 0.108 mol), sodium borohydride (20.5 g, 0.54 mol), and 800 mL of isopropanol was stirred at reflux for 18 hours, and then cooled. The excess borohydride was destroyed by the cautious addition of 20% aqueous HCl, and the product was extracted into dichloromethane. The extract was washed with water and dried with $MgSO_4$, and the solvent was removed. The residue was recrystallized from ligroin to produce 29.8 grams of 1,8-dibutoxyanthracene, which has the structural formula:

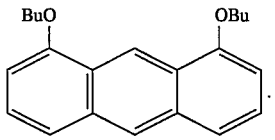

Phosphorus oxychloride (56.6 g, 0.37 mol) was added dropwise with stirring to 150 mL of anhydrous N,N-dimethylformamide (DMF) at 5° C. A solution of 1,8-dibutoxyanthracene (29.8 g, 0.092 mol) in 300 mL of DMF was added, and the stirred mixture was heated at 110° C. for 18 hours. The reaction mixture was cooled to room temperature, and was poured onto excess water. The product was extracted into dichloromethane. The extract was dried over $MgSO_4$, and the solvent was removed at reduced pressure to provide 33.9 grams of 1,8-dibutoxyanthracene-4,5-carboxaldehyde, which has the structural formula:

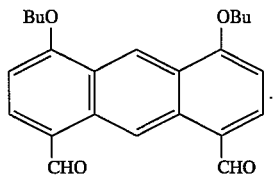

First, dimethyl (4-methylthiobenzyl)phosphonate was synthesized, as follows: Trimethylphosphite (206 g, 1.66 mol) was stirred at reflux, and 245 g (1.42 mol) of 4-methylmercaptobenzyl chloride (prepared as described in Ulman, et al. U.S. Pat. No. 4,792,208, Example 1) was added dropwise over 30 min. The mixture was kept at reflux for 4 hours, and then cooled to room temperature. Dimethyl (4-methylthiobenzyl)phosphonate was obtained by fractional distillation at reduced pressure. The yield was 263 grams, which is 75% of theoretical.

Dimethyl (4-methylthiobenzyl)phosphonate (263 g, 1.07 mol) was dissolved in 800 mL of glacial acetic acid, and 303 g of 30% hydrogen peroxide was added slowly. After the initial exothermic reaction had subsided, the mixture was heated at reflux for 2 hours, and then was cooled to room temperature. The product was concentrated at reduced pressure, and the residual viscous oil was purified by fractional distillation in vacuo. Dimethyl (4-methylsulfonylbenzyl)phosphonate was collected at 230° C. and 0.045 mm of pressure as a colorless oil which gradually crystallized on standing. The yield was 262 g, which is 98% of theoretical. The product melted at 113°–114.5° C.

A mixture of 3.47 g (9.2 mmol) of 1,8-dibutoxyanthracene-4,5-carboxaldehyde, 6.0 g (21 mmol) of dimethyl(4-methylsulfonylbenzyl)phosphonate, 1.0 g (25 mmol) of sodium hydride, and 150 mL of anhydrous 1,2-dimethoxyethane was heated at reflux under nitrogen. The precipitated product was collected by filtration, washed thoroughly with water, and dried in vacuo. The precipitated product has the structural formula:

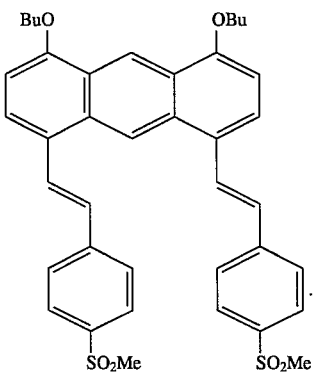

The N-ethylmaleimide adduct dipole subunit and benzyne adduct dipole subunit would be prepared from the precipitated product in the same manner as described above in Examples 2 and 3, respectively. (Other similar Dieis-Alder adduct dipole subunits would be prepared similarly.)

EXAMPLE 7

The same procedures were followed as in Example 4, with the exception that the reactants were Anti-1,4,5,8-tetrahydroanthracene-1,4:5,8-diendoxide (0.47 g, 2.24 mmol) and the intermediate product of Examples 5–6:

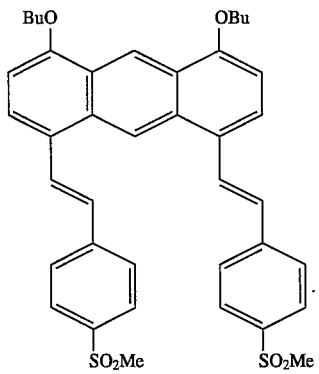

The products were recrystallized from dimethylforamide and have the two structural formulas:

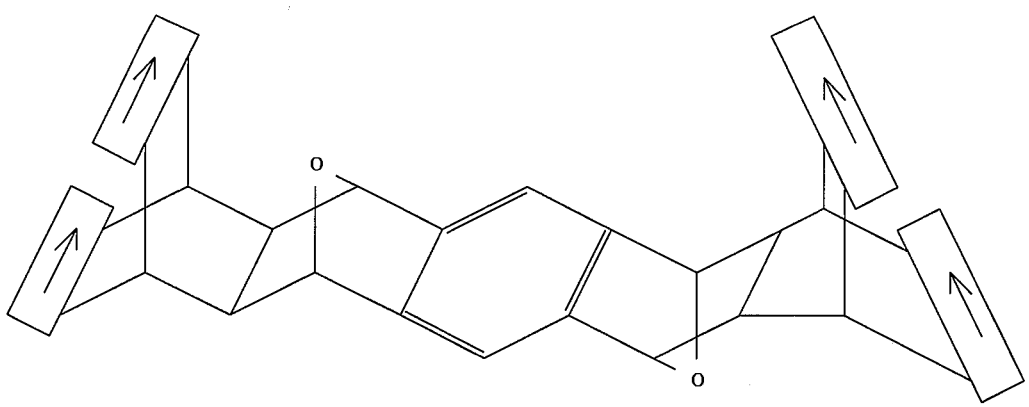

and

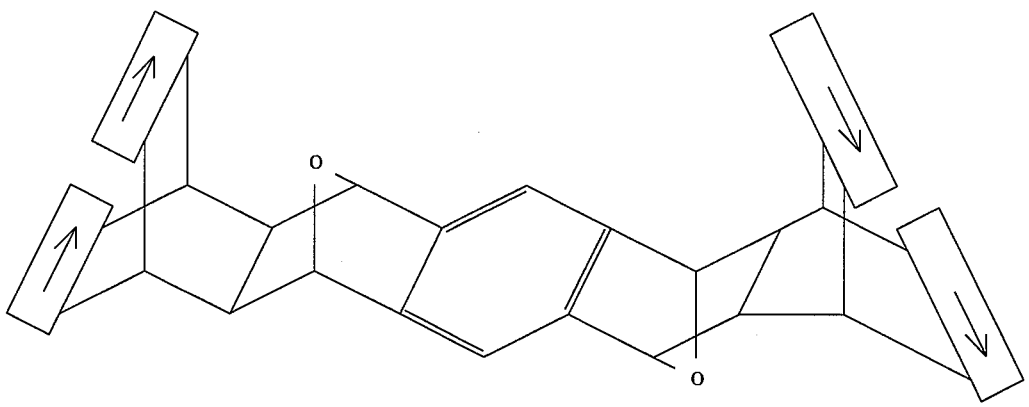

where

represents the molecular dipole:

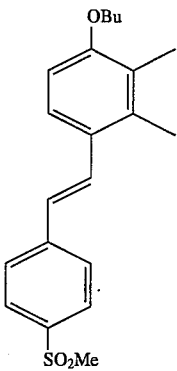

The tetramer dipole subunit could be separated from the nonpolar compound by high performance liquid chromatography as disclosed above in Example 4.

EXAMPLE 8

A mixture of 1,8-dibutoxyanthracene-4,5-carboxaldehyde (3.0 g, 7.9 mmol), t-butylsulfonylacetonitrile (2.8 g, 17 mmol), ammonium acetate (1.34 g, 17 mmol), and 80 mL of ethanol was heated at reflux for 1 hour. After the solution was cooled to room temperature, precipitated product having the structural formula:

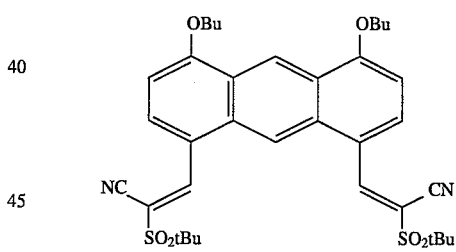

was collected by filtration, providing a yield of 3.4 grams which was 64 percent of theoretical yield. Melting point was determined to be 280° C. Proton NMR was performed as described above; $^1$H NMR (CDCl$_3$) δ: 1.1 (t, 6H), 1.7 (m, 4H), 1.6 (s, 18H), 2.05 (m, 4H), 4.37 (t, 4H), 6.93 (d, 2H), 8.49 (s, 1H), 8.58 (d, 2H), 8.89 (s, 2H), 9.52 (s, 2H). The N-ethylmaleimide adduct dipole subunit and benzyne adduct dipole subunit would be prepared from the precipitated product in the same manner as described above in Examples 2 and 3, respectively. (Other similar Dieis-Alder adduct dipole subunits would be prepared similarly.)

EXAMPLE 9

The same procedures were followed as in Examples 5–6 with the following exceptions.

Diethyl-(4-perfluorobutylsulfonylbenzyl) phosphonate was prepared as follows:

First, 4-(nonafluorophenylthio)toluene was prepared. To a mixture of 30 grams (0.24 mol) of parathiocresol in 300 mL of N,N-dimethylformamide (DMF) was added 66 grams (1.2 mol) of potassium fluoride and 100 grams (0.28 mol) of nonafluorobutyl iodide. The reaction mixture was stirred for 5 hours, and then poured into excess water. The aqueous mixture was extracted with dichloromethane, and the combined organic extracts were washed with water. The organic solution was dried with $MgSO_4$, passed through a short column of silica gel, and concentrated to produce 66 grams (80 percent yield), which was 94 percent pure by gas chromatography.

Next, alpha-bromo-4-(nonafluorophenylthio)toluene was prepared. A mixture of 66 grams (0.19 mol) of 4-(nonafluorophenylthio)toluene, 39 grams (0.21 mol) of N-bromosuccinimide, and 3 grams (%18 mol) of 2,2-azobisisobutyronitrile (AIBN), and 500 mL of carbon tetrachloride was stirred at reflux for 3 days. The reaction mixture was filtered, and the solvent was removed to deposit 42.8 (53 percent yield) of alpha-bromo-4-(nonafluorophenylthio)toluene.

Next, diethyl-4-(nonafluorobutylthio)benzylphosphonate was synthesized. A mixture of 42.8 grams (0.10 mol) of alpha-bromo-4-(nonafluorophenylthio)toluene and 100 grams of triethylphosphite was heated with stirring at reflux for 18 hours. The excess triethyl phosphite was stripped, and the residue was fractionally distilled in vacuo, collecting the fraction boiling at 132°–135° C. (0.022 mm).

Finally the diethyl-(4-perfluorobutylsulfonylbenzyl) phosphonate was prepared, as follows. To a stirred solution of 79.8 grams (0.167 mol) of diethyl(4-nonafluorobutythiobenzyl)-phosphonate in 300 mL of glacial acetic acid was added 75.7 grams (0.668 mol) of 30% hydrogen peroxide solution dropwise over 15 minutes. The resulting mixture was stirred for 30 minutes at room temperature, and then at reflux for 3 hours. An additional 46 grams (0.41 mol) of 30% hydrogen peroxide solution was added, and heating was continued for 2 hours. The solution was poured into 1000 mL of water, and the product was extracted into ether (3 times with 150 mL each time). The combined ether extracts were washed successively with 600 mL of 5% aqueous $NaHCO_3$, and 600 mL of 5% $NaHSO_3$. The organic layer was dried over $MgSO_4$, and the solvent was removed at reduced pressure. The residue was distilled in vacuo, collecting the product as a colorless oil. Boiling point was 173°–193° C (0.03 mm). The yield was 66.5 grams, 72 percent of theoretical. Proton NMR was performed as in the other examples. $^1H$ NMR ($CDCl_3$) δ: 1.22 (t, J=7.0, 6H), 3.25 (d, $J_{HP}$=22.6, 2H), 4.08 (m, 4H), 7.59 (d, J=8.2, 2H), 7.95 (d, J=8.1, 2H).

1,8-Dibutoxyanthracene-4,5-carboxaldehyde (2.5 g, 6.7 mmol) was reacted with diethyl-(4-perfluorobutylsulfonylbenzyl)phosphonate (7.0 g, 13.7 mmol), and sodium hydride (0.6 g, 15 mmol) and the precipitated product, which has the structural formula:

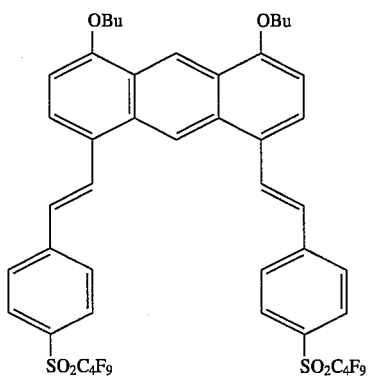

was recrystallized from o-dichlorobenzene.

The above product (1.0 g, 0.92 mmol) was treated with dibutylfumarate (1.0 g, 4.4 mmol) in 10 mL of o-dichloromethane at reflux under nitrogen for 42 hours. The reaction mixture was cooled to room temperature, and most of the o-dichloromethane was removed at reduced pressure. The residue was triturated with 15 mL of hexanes and the product was collected by filtration. The structural formula for the product is:

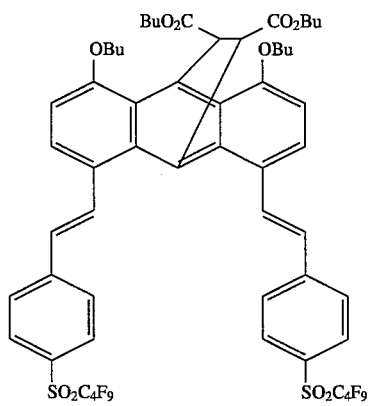

Proton NMR was performed as described above. $^{13}C$ {$^1H$} NMR was also performed in the same manner. $^1H$ NMR ($CDCl_3$) δ: 0.71 (t, J=7.3, 3H), 0.95 (t, J=7.4, 3H), 1.0 (two overlapping t, J=7.5, 6H), 1.14 (q, J=7.4, 2H), 1.4 (m, 4H), 1.6 (m, 6H), 1.8 (m, 4H), 3.27 (m, 1H), 3.41 (m, 1H), 3.8–4.1 (m, 8H), 5.67 (d, 1H), 5.75 (d, 1H), 6.7 (two overlapping d, J=8.4, 2H), 7.00 (d, J=16.1, 2H), 7.37 (d, J=8.7, 1H), 7.41 (d, J=8.7, 1H), 7.69 (d, J=8.4, 4H), 7.72 (d, J=14, 1H), 7.85 (d, J=16.1, 1H), 7.92 (d, J=7.6, 4H). $^{13}C$ {$^1H$} NMR ($CDCl_3$) δ: 13.4, 13.6, 13.8, 19.0, 19.1, 19.2, 19.3, 30.5, 30.6, 31.4, 31.5, 46.7, 47.2, 65.0, 65.1, 68.1, 68.4, 110.4, 110.7, 123.8, 124.7, 125.0, 125.4, 125.8, 126.8, 128.9, 130.4, 130.7, 131.4, 131.6, 141.0, 142.6, 146.0, 154.2, 155.4, 172.2, 172.3.

An absorption spectrum was taken in the same manner as in Example 1 and is graphed in FIG. 4.

EXAMPLE 10

The N-ethylmaleimide adduct of Example 1, which has the structural formula

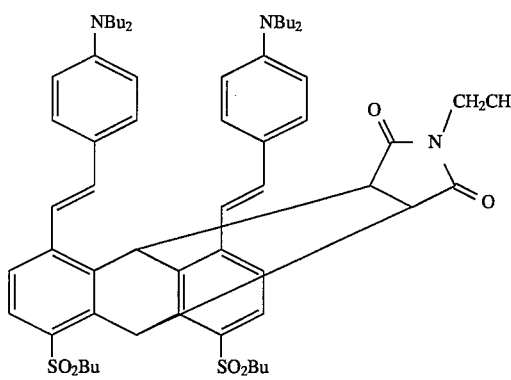
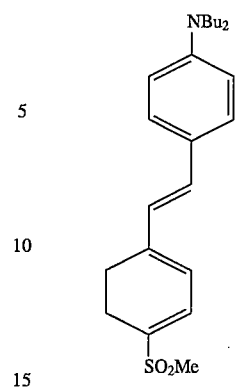

was prepared as in Example 1. A solution was then prepared containing 4.4 mg of the N-ethylmaleimide adduct, 225 mg of polymethylmethacrylate, and 3 ml of 1,2,3-trichloropropane. The resulting solution was mechanically stirred for 30 minutes and then filtered through a 0.5 micron filter and dispensed onto an indium tin oxide coated glass substrate spinning at 1500 rpm. After spin coating, the film-coated substrate was stored in a laminar flow hood for 5 hours followed by baking in a vacuum oven at 123° C. for 23 hours to provide an optical article of the invention having a medium including dipole subunits, having the structural formula:

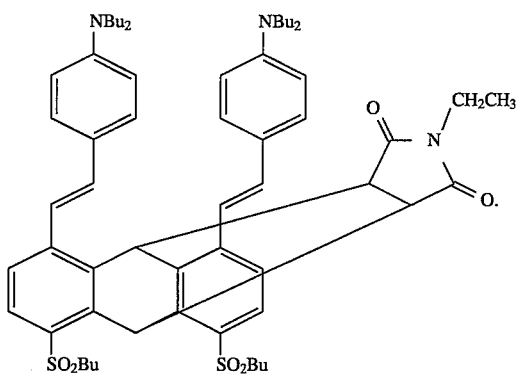

After baking, the medium of the optical article was measured to have a thickness of 1.03 microns using a stylus. Visual and microscopic examination showed the medium to have excellent optical quality.

EXAMPLE 11

An optical article was prepared as in Example 10 with the exception that the solution used contained 23 mg of the H-ethylmaleimide adduct of Example 1. The medium of the optical article prepared had excellent optical quality and a thickness of 1.12 microns.

COMPARATIVE EXAMPLE 1

EFISH measurements were made, in the same manner as disclosed in Example 1, except instead of a dipole subunit, the medium included the monomeric dipole 4-dibutylamino-4'-methylsulfonylstilbene, which has the structural formula:

prepared by the following adaptation of a procedure disclosed in U.S. Pat. No. 4,792,208 to Ulman et al. In the synthesis of 4-dibutylamino-4'-methylsulfonylstilbene, first, a stirred suspension of 4-N,N-dibutylaminobenzaldehyde (2.50 g, 10.7 mmol), 0.64 g (16 mmol) of 60% sodium hydride dispersion, an 50 mL of anhydrous ethyleneglycoldimethylether was treated with a solution of diethyl (4-methylsulfonylbenzyl)phosphonate (prepared as in Ulman, et al., U.S. Pat. No. 4,792,208, Example 3) and heated at reflux for 24 hours under nitrogen. The reaction mixture was cooled to room temperature and was poured onto 200 g of ice. The product was extracted into dichloromethane (3 times with 100 mL each time), and the combined organic extracts were dried over $MgSO_4$. The solvent was removed at reduced pressure to deposit a yellow oil which gradually crystallized on standing. The product was purified by two recrystallizations from methanol and two recrystallizations from toluene/hexane (50%/50%). The yield was 2.35 grams, which was 57% of theoretical. The product melted at 112°–114° C. $^1H$ NMR was performed as in the Examples and $^{13}C$ $\{^1H\}$ NMR was also performed in the same manner. $^1H$ NMR ($CDCl_3$) δ: 0.96 (t, J=7.3, 6H), 1.4 (m, 4H), 1.6 (m, 4H), 3.05 (s, 3H), 3.30 (t, J=7.5, 4H), 6.62 (d, J=8.6, 2H), 6.86 (d, J=16.2, 1H), 7.16 (d, J=16.2, 1H), 7.39 (d, J=8.6, 2H), 7.59 (d, J=8.3, 2H), 7.85 (d, J=8.3, 2H). $^{13}C$ $\{^1H\}$ NMR ($CDCl_3$) δ: 14.0, 20.4, 29.5, 44.7, 50.8, 111.6, 121.1, 123.4, 126.3, 127.7, 128.4, 133.0, 137.5, 144.1, 148.6. FDMS displayed the molecular ion at 385 m/e.

EFISH measurements are presented in Table 2. A value of μβ of $480*10^{-48}$ esu was derived.

An absorption spectrum was taken in the same manner as in Example 1 and is graphed in FIG. 1. The curve produced very closely matches the curve for the dimer dipole subunit of Example 1.

COMPARATIVE EXAMPLE 2

1,8-(Dibutylsulfonyl)-4,5-{(4'-dibutylamino)styrl}anthracene, having the structural formula:

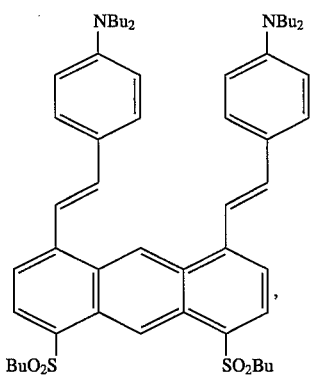

was prepared as previously described and an absorption spectrum was taken, as in Example 1. The spectrum is graphed in FIG. 1. The curve produced differs greatly from the curve for the dimer dipole subunit of Example 1.

COMPARATIVE EXAMPLE 3

An absorption spectrum was taken using the procedures described in Example 1 of the monomeric dipole 4-(6-hydroxyhexyloxy)-4-methylsulfonylstilbene, which has the structural formula:

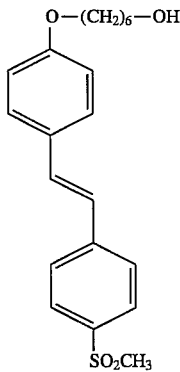

and was prepared as follows: First, 4-(6-acetoxyhexyloxy) benzaldehyde was prepared as follows: A mixture of 81.0 g (0.66 mol) of 4-hydroxybenzaldehyde, 99.7 g (0.73 mol) of 6-chloro-1-hexanol, 70.3 g (0.66 mol) of sodium carbonate, 49.7 g (0.33 mol) of sodium iodide, and 250 mL of 2-butanone was stirred mechanically and heated at reflux for 72 hours. The cooled reaction mixture was filtered, and the solvent was removed at reduced pressure to deposit the 4-(6-hydroxyhexyloxy)benzaldehyde as a brown oil. This oil was dissolved in 200 mL of pyridine, and 74.3 g (0.73 mol) of acetic anhydride was added dropwise with stirring. After the addition was completed, the reaction mixture was heated at reflux for 6 hours, and then cooled to room temperature. The mixture was poured onto 500 mL of water, and the product was extracted into dichloromethane (3 times using 250 mL each time). The combined organic extracts were washed successively with 5% aqueous HCl (2 times using 250 mL each time), and with saturated aqueous NaCl (250 mL). The organic layer was dried over $MgSO_4$, was filtered, and the solvent was removed. The tan oily residue was fractionally distilled at reduced pressure, collecting the product 4-(6-acetoxyhexyloxy)-benzaldehyde at 190°–224° C. and pressure of 0.04 mm. The yield was 84.2 g, which is 48% of theoretical. Proton NMR was performed as in the Examples. $^1$H NMR ($CDCl_3$) δ: 1.4 (m, 4H), 1.6 (m, 2H), 1.75 (m, 2H), 2.00 (s, 3H), 4.0 (m, 4H), 6.92 (d, 2H), 7.78 (d, 2H), 9.80 (s, 1H).

Next, a mixture of dimethyl (4-methylsulfonylbenzyl)phosphonate (88.6 g, 0.319 mol), 16 g (0.398 mol) of 60% sodium hydride dispersion, and 1.4 g (0.0014 mol) of 15-crown-5 (catalyst) in 250 mL of dry tetrahydrofuran (THF) was stirred mechanically and treated with a solution of 84.2 g (0.319 mol) of 4-(6-acetoxyhexyloxy)-benzaldehyde in 100 mL of THF. The stirred mixture was cautiously heated. (CAUTION: There was a sudden large gas evolution accompanied by foaming. Heating was discontinued until the reaction had calmed.) The reaction mixture was stirred at reflux under nitrogen for 5 hours, and then a solution of 20 grams of sodium hydroxide in 120 mL of water was added. The mixture was stirred at reflux for 18 hours, and then cooled to room temperature. The precipitated product was extracted into a large volume of warm THF, and then the extracts were dried over $Na_2SO_4$, and were filtered. The solvent was removed at reduced pressure, and the residue was purified by successive recrystallizations from toluene/ THF (about 50/50%) and from ethanol/pyridine (70/30%). The yield of 4-(6-hydroxyhexyloxy)-4-methylsulfonylstilbene was 90.1 grams, which was 76% of theoretical. Proton NMR was performed using the same procedures as described in the Examples, except dimethylsulfoxide-$d_6$ was used. $^1$H NMR (DMSO-$d_6$) δ: 1.4 (m, 6H), 1.65 (m, 2H), 3.18 (s, 3H), 3.34 (m, 2H), 3.94 (t, J=6.4, 2H), 4.34 (t, J=5.0, 1H), 6.92 (d, J=8.6, 2H), 7.16 (d, J=16.4, 1H), 7.37 (d, J=16.4, 1H), 7.54 (d, J=8.6, 2H), 7.77 (d, J=8.4, 2H), 7.85 (d, J=8.4, 2H).

An absorption spectrum was taken using the procedures described in Example 1. The spectrum is graphed in FIGS. 2 and 3. The curve produced does not substantially differ from the curve for the dimer dipole subunit of Example 2, shown in FIG. 2 and the curve for the tetramer dipole subunit of Example 4.

COMPARATIVE EXAMPLE 4

The intermediate product of Example 2 having the structural formula:

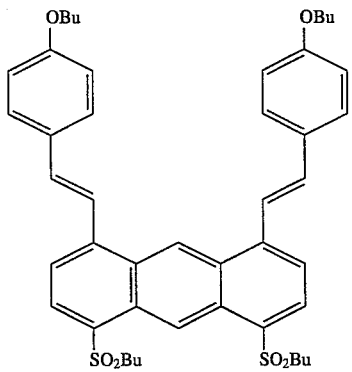

was prepared as previously described and an absorption spectrum was taken, as in Example 2. The spectrum is graphed in FIG. 2. The curve produced differs greatly from the curve for the dimer dipole subunit of Example 2.

COMPARATIVE EXAMPLE 5

An absorption spectrum was taken using the procedures described in Example 1 of the monomeric dipole 4-butoxy-4-nonafluorobutylsulfonylstilbene, which has the structural formula:

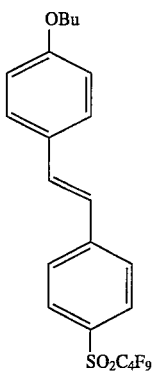

and was prepared as follows.

A stirred suspension of 0.57 grams (13.5 mmol) of 60% sodium hydride dispersion and 10 drops of 15-crown-5 (catalyst) in 25 mL of dry ethyleneglycoldimethylether under nitrogen was treated dropwise with a solution of 5.73 grams (11.2 mmol) of diethyl (4-nonafluorobutylsulfonylbenzyl) phosphonate in 10 mL of the same solvent. A solution of 2.00 grams (11.2 mmol) of 4-butoxybenzaldehyde in the same solvent was added, and the the resulting mixture was heated at reflux for 18 hours under nitrogen. The reaction mixture was cooled to room temperature, and was poured into 250 mL of water. The precipitated product was filtered, washed with water, and air dried. The product was purified by recrystallization from isopropanol. The yield was 4.2 grams, which is 70% of theoretical. The product melted at 112°–113° C. Proton NMR was performed as previously described. $^1$H NMR (CDCl$_3$) δ: 0.99 (t, J=7.4, 3H), 1.5 (m, 2H), 1.8 (m, 2H), 4.00 (t, J=6.5, 2H), 6.93 (d, J=8.6, 2H), 7.00 (d, J=16.3, 1H), 7.28 (d, J=17, 1H), 7.50 (d, J=8.6, 2H), 7.71 (d, J=8.5, 2H), 7.96 (d, J=8.4, 2H). Fast-atom bombardment mass spectroscopy (FAB-MS) detected the parent ion at 534 m/e.

An absorption spectrum was taken in the same manner as in Example 1 and is graphed in FIG. 4.

COMPARATIVE EXAMPLE 6

An optical article was prepared as in Example 10 with the exception that the solution used contained 4.2 mg of the monomeric dipole 4-dibutylamino-4'-methylsulfonylstilbene, instead of the N-ethylmaleimide adduct. The article prepared had a film which showed excellent optical quality and a thickness of 1.07 microns.

TABLE 1

| Conc. (in g/L) | Amplitude (in arbitrary units) | Period (in arbitrary units) | Voltage (in kV) | $\Gamma$EFISH (in arbitrary units) |
| --- | --- | --- | --- | --- |
| 0.00 | 5.58 | 7.36 | 6.15 | 5.21 |
| 0.00 | 5.71 | 7.39 | 6.15 | 5.26 |
| 0.00 | 6.14 | 7.36 | 6.15 | 5.47 |
| 0.00 | 6.39 | 7.41 | 6.15 | 5.55 |
| 1.42 | 6.55 | 7.36 | 5.70 | 6.10 |
| 2.20 | 6.89 | 7.27 | 4.95 | 7.29 |
| 2.20 | 6.53 | 7.34 | 4.95 | 7.03 |
| 2.20 | 6.49 | 7.31 | 4.95 | 7.04 |
| 2.84 | 3.68 | 7.30 | 3.00 | 8.76 |
| 2.84 | 3.59 | 7.27 | 3.00 | 8.67 |
| 2.84 | 3.39 | 7.28 | 3.00 | 8.42 |
| 4.40 | 4.27 | 7.26 | 2.80 | 10.2 |
| 4.40 | 4.18 | 7.33 | 2.80 | 9.97 |

TABLE 1-continued

| Conc. (in g/L) | Amplitude (in arbitrary units) | Period (in arbitrary units) | Voltage (in kV) | $\Gamma$EFISH (in arbitrary units) |
| --- | --- | --- | --- | --- |
| 4.40 | 4.08 | 7.27 | 2.80 | 9.93 |

TABLE 2

| Conc. (in g/L) | Amplitude (in arbitrary units) | Period (in arbitrary units) | Voltage (in kV) | $\Gamma$EFISH (in arbitrary units) |
| --- | --- | --- | --- | --- |
| 0.0 | 6.01 | 7.34 | 6.0 | 5.56 |
| 0.0 | 6.14 | 7.38 | 6.0 | 5.59 |
| 8.97 | 9.45 | 17.09 | 2.9 | 15.0 |
| 8.97 | 9.26 | 17.04 | 2.9 | 14.9 |

The advantages of the invention can be further appreciated by comparing Example 1 and Comparative Example 1. In Example 1, an optical article of the invention has a dipole subunit bearing a pair of identical molecular dipoles. In Comparative Example 1, an optical article has the same molecular dipole in discrete form. The measured magnitudes of μβ differ by a factor of 2.9. The absorption spectra are very similar.

The invention provides the advantageous result of an optical article including a medium that has polar aligned dipole subunits in which molecular dipoles are joined together in parallel relative relation and a μβ greater than a linear combination of the μβ's of a uncorrelated mixture of the molecular dipoles.

The invention has been described in detail with particular reference to preferred embodiments thereof, but it will be understood that variations and modifications can be effected within the spirit and scope of the invention.

What is claimed is:

1. An optical article, for the transmission of electromagnetic radiation, said optical article including: a medium exhibiting a second-order electric susceptibility greater than $10^{-9}$ electrostatic units, said medium including polar aligned dipole subunits, each said dipole subunit having a plurality of noncentrosymmetric molecular dipoles and a connector system, each said molecular dipole having an electron donor moiety, an electron acceptor moiety, and a linking moiety, said linking moiety having a pair of covalent bonds to said connector system, each said molecular dipole having a conjugated π bonding system extending from said electron donor moiety along said linking moiety to said electron acceptor moiety to permit oscillation of said molecular dipole between a ground state and an excited state, said states differing in polarity, said connector system joining said linking moieties to complete a solitary ring or a system of fused rings retaining said molecular dipoles in substantially parallel relative vector relation.

2. The optical article of claim 1 wherein said dipole subunits have substantially the same electronic absorption spectrum as a uncorrelated mixture of said molecular dipoles at an equal concentration of said molecular dipoles.

3. The optical article of claim 1 wherein said connector system substantially precludes π conjugation between conjugated π bonding systems of said molecular dipoles.

4. The optical article of claim 1 wherein said dipole subunits each have from 2 to about 8 of said molecular dipoles.

5. The optical article of claim 1 wherein each said molecular dipole has the capability of exhibiting a μβ, as an uncorrelated molecular dipole, of greater than $10^{-48}$ esu, wherein μβ represents the vector product of the molecular ground state dipole moment and the molecular first hyperpolarizability.

6. The optical article of claim 5, wherein said dipole subunits have a μβ greater than 1.3 times the sum of the μβ's exhibited by said molecular dipoles as uncorrelated molecular dipoles.

7. The optical article of claim 5, wherein said dipole subunits have a μβ]greater than 2 times the sum of the μβ's exhibited by said molecular dipoles as uncorrelated molecular dipoles.

8. The optical article of claim 5, wherein said dipole subunits have a mb greater than about 3 times the sum of the mb's exhibited by said molecular dipoles as uncorrelated molecular dipoles.

9. The optical article of claim 1 wherein said molecular dipoles have the general structure:

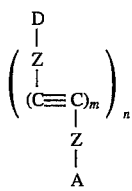

or

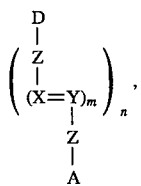

wherein

A is an electron acceptor,

D is an electron donor,

X is CH or N,

Y is CH or N, m is an integer from 0 to 4, n is an integer from 0 to 4, and each Z is independently selected and is a direct link or Z is arylene or heteroarylene.

10. The optical article of claim 9 wherein D is selected from the group consisting of $R_2N$, RO, and RS; and A is selected from the group consisting of $SO_2R$, $SO_2NR_2$, $NO_2$, CN, $CO_2R$, $CF_3$, $CO_2CF_3$, $CH=C(CN)_2$,

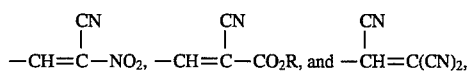

wherein R is H, or alkyl, cycloalkyl, or aryl.

11. The optical article of claim 1 wherein said dipole subunits have general structures selected from the group consisting of:

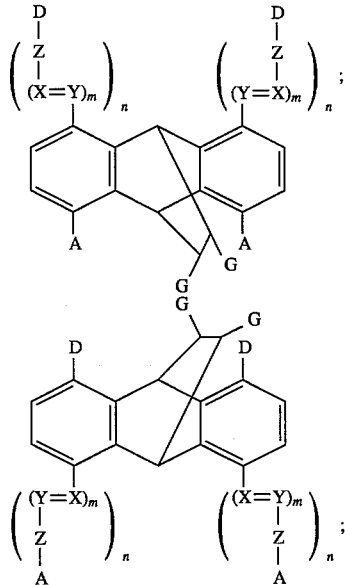

-continued
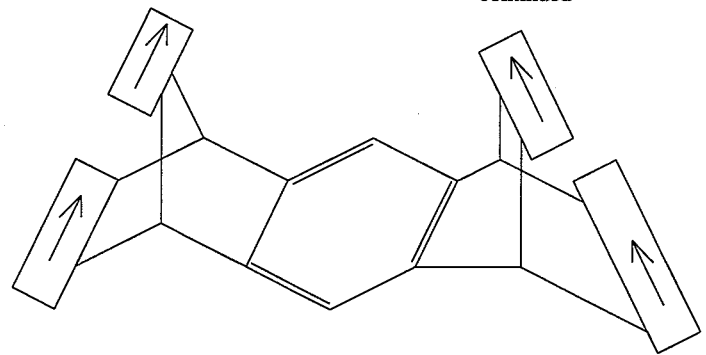
wherein  represents
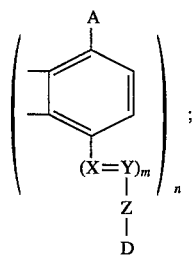
;
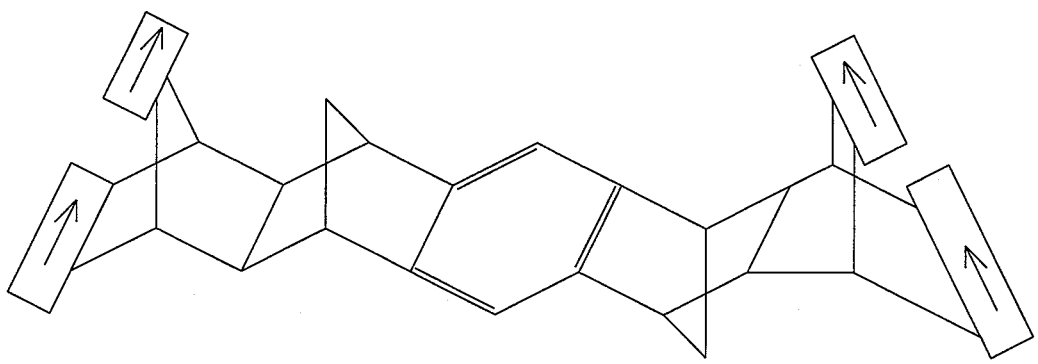
wherein  represents
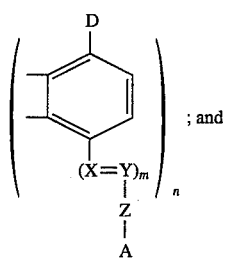
; and

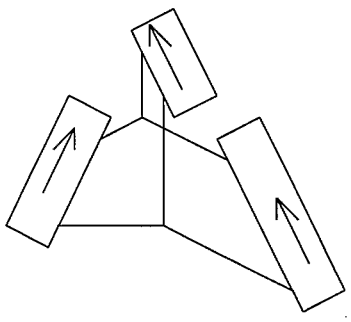

wherein 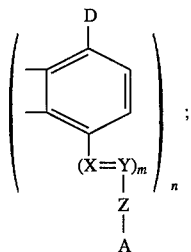 represents $$\left( \begin{array}{c} D \\ | \\ \phantom{x} \\ | \\ (X=Y)_m \\ | \\ Z \\ | \\ A \end{array} \right)_n ;$$

wherein in all said structural formulas:

A is an electron acceptor,

D is an electron donor,

X is CH or N,

Y is CH or N, m is an integer from 0 to 4, n is an integer from 0 to 4, each Z is independently selected and is a direct link or Z is arylene or heteroarylene, and each G is independently selected and is a point of attachment to another dipole subunit, or is optionally substituted alkyl, cycloalkyl, aryl, or is H, CN, $CO_2E$, $SO_2E$, COE, $CONE_2$, halo, or SOE, where E is H, alkyl, aryl, or heteroaryl.

12. The optical article of claim 1 wherein said medium is polymeric.

13. The optical article of claim 12 wherein said medium is a solid solution of said dipole subunits in a polymeric binder.

14. The optical article of claim 13 wherein said polymeric binder is selected from the group consisting of transparent linear polymers.

15. An optical article, for the transmission of electromagnetic radiation, said optical article including: a medium exhibiting a second-order electric susceptibility greater than $10^{-9}$ electrostatic units, said medium having polar aligned dipole subunits, each said dipole subunit having a plurality of noncentrosymmetric molecular dipoles and a connector system, each said molecular dipole having a pair of covalent bonds to said connector system, each said molecular dipole having an electron donor moiety linked through a conjugated π bonding system to an electron acceptor moiety to permit oscillation of said molecular dipole between a ground state and an excited state, said states having differing polarities, said connector system retaining said molecular dipoles in substantially parallel relative vector relation, said connector system substantially interrupting conjugation between said molecular dipoles.

16. The optical article of claim 15 wherein said dipole subunits have general structures selected from the group consisting of:

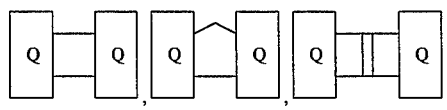
,
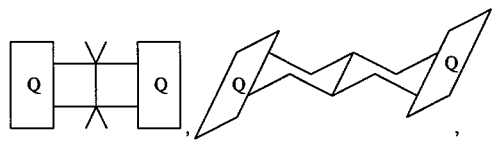
,
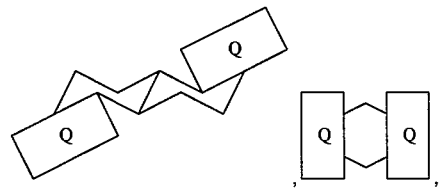
,
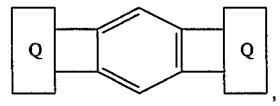
,
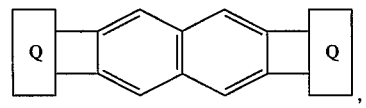
,

-continued

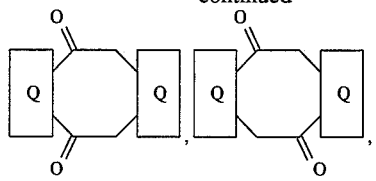

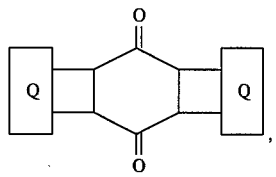

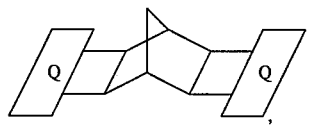

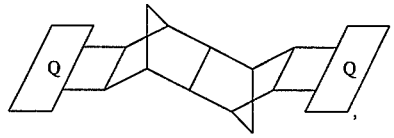

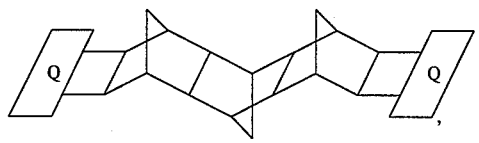

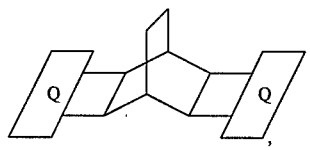

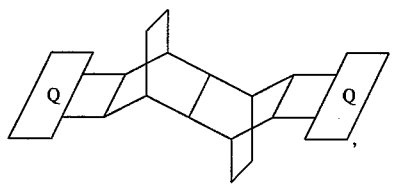

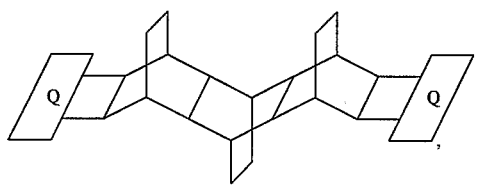

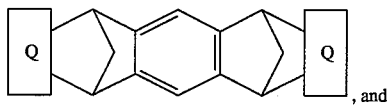

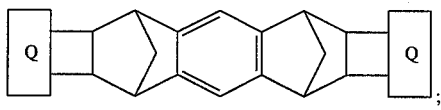

wherein each

independently represents one of said molecular dipoles or represents

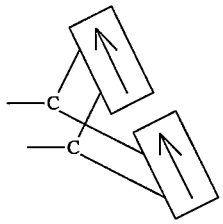

where each

represents one of said molecular dipoles.

17. The optical article of claim 16 wherein said molecular dipoles have the general structure:

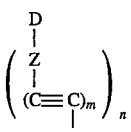 or

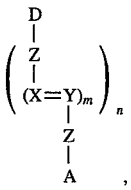

wherein
A is an electron acceptor,
D is an electron donor,
X is CH or N,
Y is CH or N,
m is an integer from 0 to 4,
n is an integer from 0 to 4, and
each Z is independently selected and is a direct link or Z is arylene or heteroarylene 18. The optical article of claim 15 wherein said molecular dipoles have the general structure:

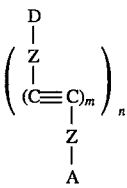 or

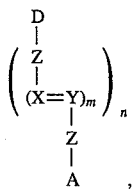

wherein

A is an electron acceptor,

D is an electron donor,

X is CH or N,

Y is CH or N, m is an integer from 0 to 4, n is an integer from 0 to 4, and each Z is independently selected and is a direct link or Z is arylene or heteroarylene.

19. The optical article of claim 1 wherein said dipole subunits each have the general structure:

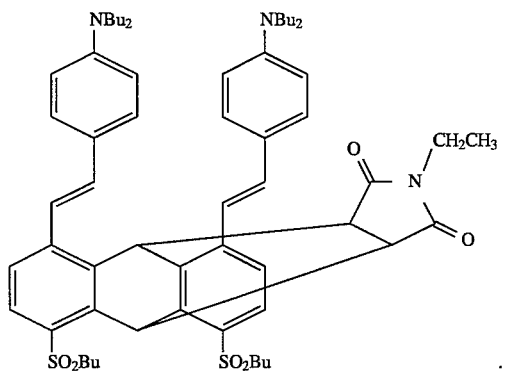

20. The optical article of claim 15 wherein said dipole subunits each have the general structure:

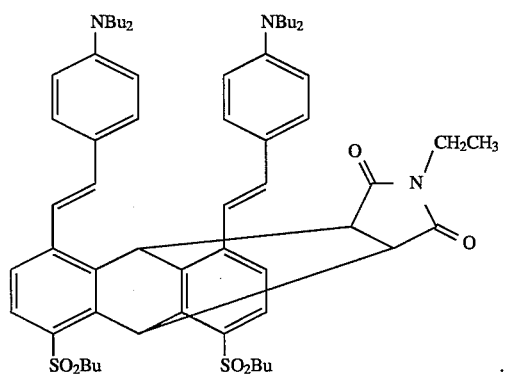

21. The optical article of claim 1 wherein each said dipole subunit includes a plurality of noncentrosymmetric molecular dipoles and a connector system represented by a general structure selected from the group consisting of:

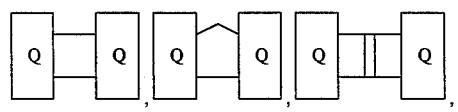

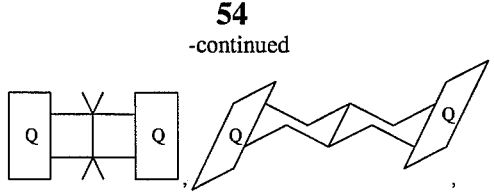

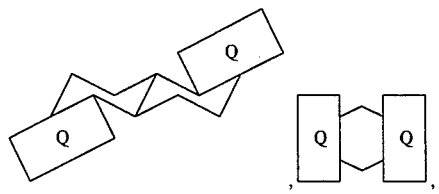

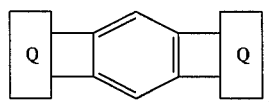

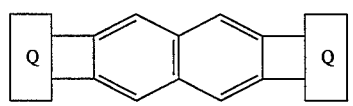

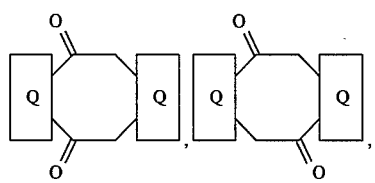

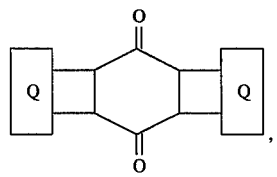

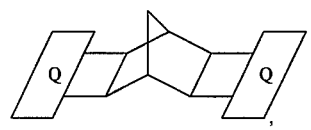

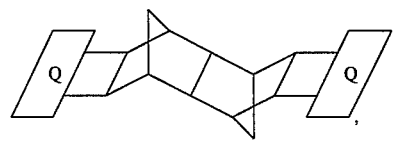

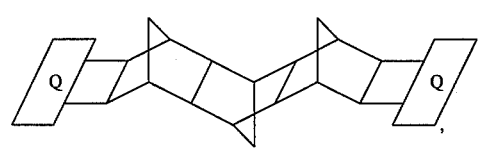

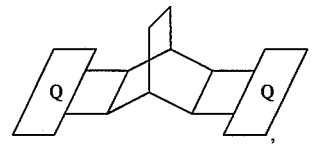

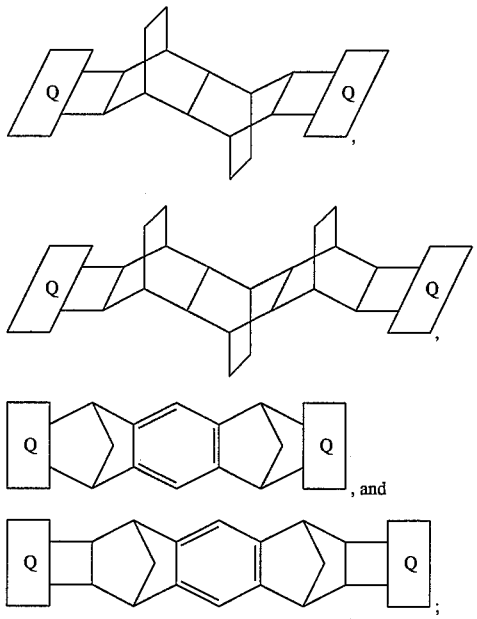

wherein each

independently represents one of said molecular dipoles or a moiety incorporating a plurality of said molecular dipoles in parallel relation and said structures are optionally heteroatomic, with heteroatoms selected from the group consisting of S, N, O, and P.

22. The optical article of claim 1 wherein said dipole subunit includes a plurality of noncentrosymmetric molecular dipoles and a connector system represented by a general structure selected from the group consisting of:

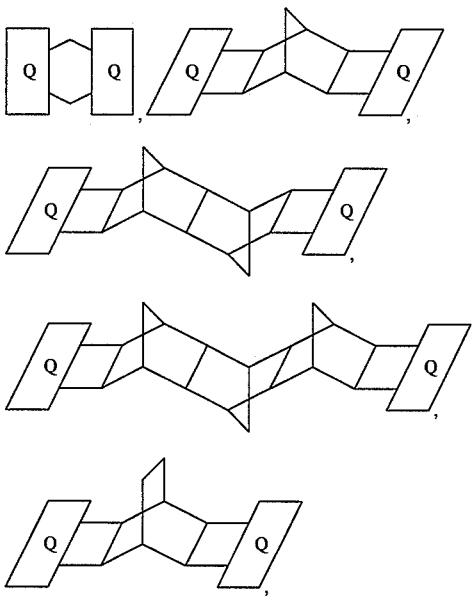

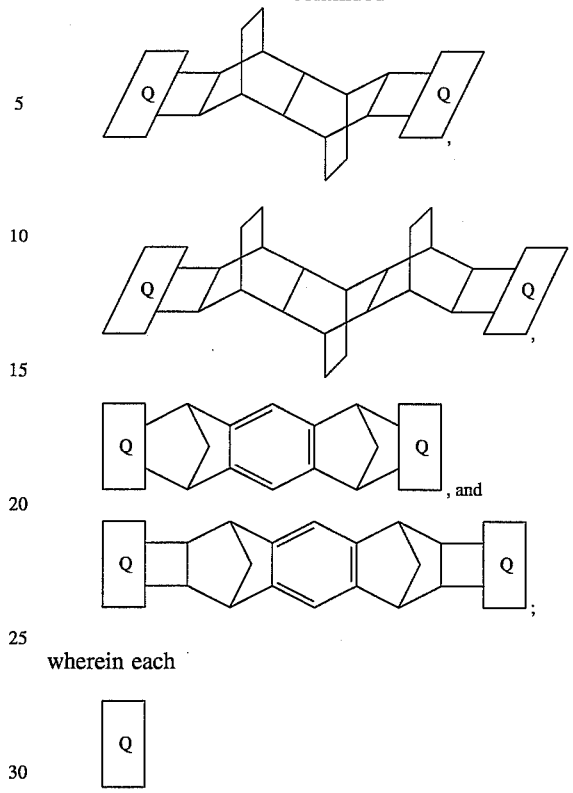

wherein each

independently represents one of said molecular dipoles or a moiety incorporating a plurality of said molecular dipoles in parallel relation and said structures are optionally heteroatomic, with heteroatoms selected from the group consisting of S, N, O, and P.

23. The optical article of claim 1 wherein each said electron donor moiety and each said electron acceptor moiety is unique to an individual said molecular dipole.

24. The optical article of claim 1 wherein said dipole subunit includes a plurality of noncentrosymmetric molecular dipoles and a connector system represented by a general structure:

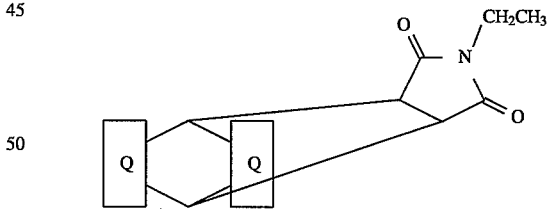

wherein each

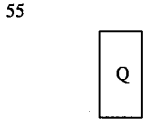

independently represents one of said molecular dipoles or a moiety incorporating a plurality of said molecular dipoles in parallel relation.

25. The optical article of claim 1 wherein said dipole subunits have general structures selected from the group consisting of:

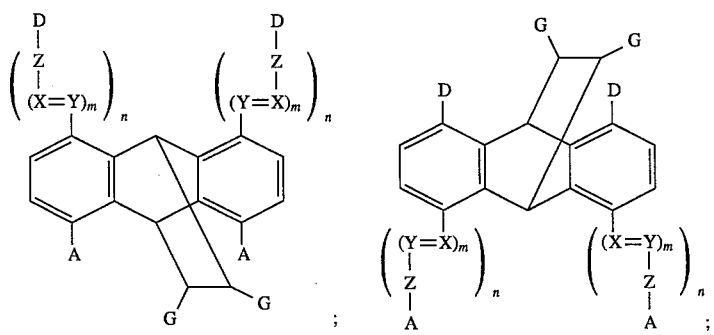
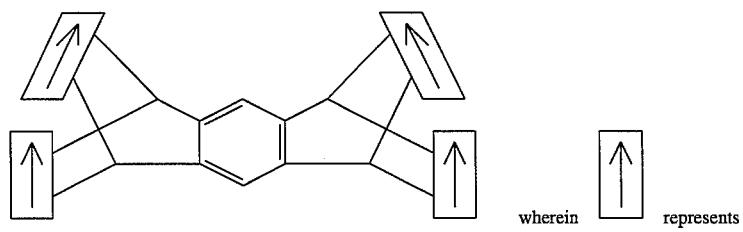
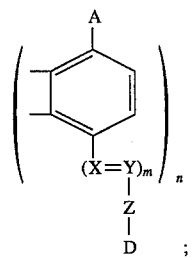 wherein 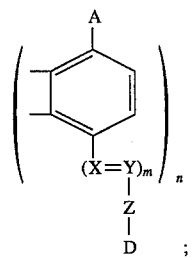 represents
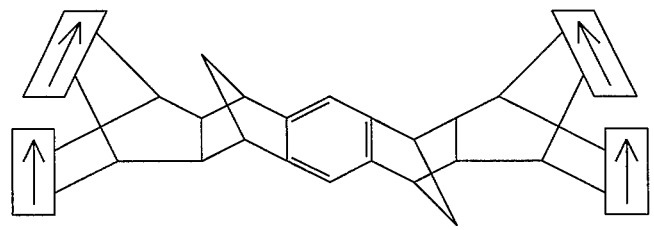 ; and
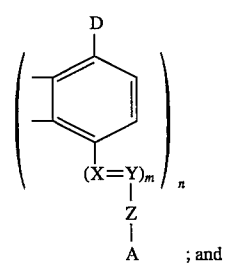 wherein 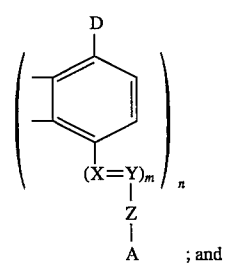 represents
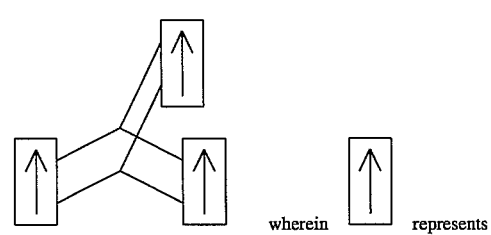 wherein 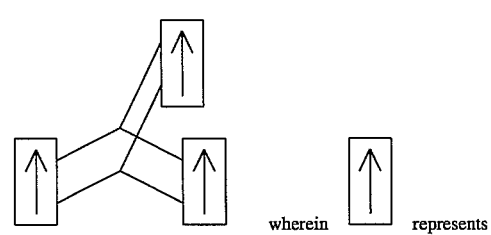 represents

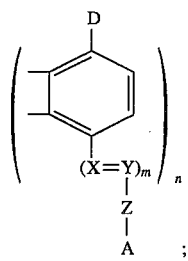

wherein in all said structural formulas:
- A is an electron acceptor,
- D is an electron donor,
- X is CH or N,
- Y is CH or N,
- m is an integer from 0 to 4,
- n is an integer from 0 to 4,
- each Z is independently selected and is a direct link or Z is arylene or heteroarylene, and
- each G is independently selected and is a point of attachment to another dipole subunit, or is alkyl, cycloalkyl, aryl, H, CN, $CO_2E$, $SO_2E$, COE, $CONE_2$, halo, or SOE, where E is H, alkyl, aryl, or heteroaryl, or both G's represent the atoms and bonds necessary to complete a ring system, said ring system having a single five or six membered ring, said members being carbons or heteroatoms selected from the group consisting of N, O, and S.

26. The optical article of claim 5, wherein said dipole subunits have a mb greater than 2 times the measured mb exhibited by said molecular dipoles as uncorrelated molecular dipoles.

* * * * *